United States Patent
Ishihara et al.

(12) 
(10) Patent No.: US 6,183,363 B1
(45) Date of Patent: Feb. 6, 2001

(54) GAME DEVICE AND SCREEN DISPLAY METHOD THEREOF

(75) Inventors: Manabu Ishihara; Kazuyuki Mukaida; Teruhito Abe, all of Tokyo (JP)

(73) Assignee: Kabushiki Kaisha Sega Enterprises, Tokyo (JP)

( * ) Notice: Under 35 U.S.C. 154(b), the term of this patent shall be extended for 0 days.

(21) Appl. No.: 09/014,658

(22) Filed: Jan. 28, 1998

(30) Foreign Application Priority Data

Jan. 30, 1997 (JP) .................................... 9-017235

(51) Int. Cl.$^7$ ...................................... A63F 9/22
(52) U.S. Cl. ........................ 463/31; 463/1; 463/3
(58) Field of Search ................. 463/3, 4, 2, 30, 463/31, 32, 36, 43, 1; 434/247, 248

(56) References Cited

U.S. PATENT DOCUMENTS

| | | | |
|---|---|---|---|
| 4,672,541 | * | 6/1987 | Bromley et al. .......................... 463/3 |
| 5,435,554 | * | 7/1995 | Lipson ..................................... 463/3 |
| 5,660,547 | * | 8/1997 | Copperman ............................. 434/62 |
| 5,779,548 | * | 7/1998 | Asai et al. ............................... 463/31 |

OTHER PUBLICATIONS

Triple Play 97 review by Jason Sabotin, CNET Gamecenter.com —game news, pp. 1 and 2, downloaded from website http://www.gamecenter.com/Reviews/item/Textonly/0,78, 0–257,00.html?st.gc.re.lnk.pfv,Sep. 1996.*

Sports Review, NHL hockey '96, Strategy Plus, Inc., pp. 1–10, downloaded from http://www.cdmag.com/sports$_{13}$ valut/nhl_hockey_96, Dec. 1996.*

Tony La Russa Baseball 3: 1996 Ediition Review, Strategy Plus, INc., pp. 1–4, downloaded from http://www.cdmag.com/sports_vault/tony_larussa_3_review, Dec. 1996.*

* cited by examiner

Primary Examiner—Joe H. Cheng
(74) Attorney, Agent, or Firm—Finnegan, Henderson, Farabow, Garrett & Dunner, L.L.P.

(57) ABSTRACT

The present invention aims at providing a game device that is easier to use for the player. Therefore, the game device according to the present invention advances the game from a position in which the time axis of the game is slightly returned when the screen is switched. Accordingly, the difficulty of the game operation after the screen is switched may be reduced.

16 Claims, 23 Drawing Sheets

FIG.15

PLAYER POWER CHART

TEAM X

| PLAYER'S NAME | A | B | C | ... | R |
|---|---|---|---|---|---|
| POSITION | FIRST BASE | RIGHT FIELD | CENTER FIELD | ... | CATCHER |
| BATTING POWER | 5 | 4 | 4 | ... | 3 |
| FIELDING POWER | 4 | 4 | 5 | ... | 4 |
| RUNNING POWER | 2 | 4 | 4 | ... | 3 |
| THROWING POWER | 3 | 4 | 5 | ... | 5 |
| PHYSICAL STRENGTH | 2 | 5 | 4 | ... | 3 |
| CHARACTER | I | II | III | ... | III |

GAME DEVICE AND SCREEN DISPLAY METHOD THEREOF

BACKGROUND OF THE INVENTION

1. Field of the Invention

The present invention relates to a game device, and more particularly relates to the improvement, etc. of the screen display method thereof.

2. Description of the Prior Art

In the so-called video game devices, by watching the screen and operating the pad to control the movement of the objects, the game is advanced. In the recent 3D (three-dimensional) game devices, there are types in which the display with a plurality of viewpoints within the virtual space is possible.

However, if the screen is switched due to changes in the viewpoint, there are situations in which the player may not be able to immediately react to the game in the new screen because the game is advancing in real-time within the virtual space. Such case is not desirable in that the player's reaction is delayed and the game becomes too difficult.

Furthermore, as the game screen is able to react quickly pursuant to the CPU becoming highly efficient, it will become difficult to hit fast pitches in baseball games, etc.

Moreover, as game devices generally only possess input devices with basic structures, the direct input of commands, etc. is difficult.

SUMMARY OF THE INVENTION

Therefore, the present invention aims at providing a game device that is easy for the player to use and the screen display method thereof. Specifically, the aim is to give the player sufficient time to react by advancing the game from a position slightly returned from the time axis of the game when the screen is switched.

In order to achieve this aim, the game device of the present invention comprises game proceeding means for arranging an object in the virtual space formed within the computer system and proceeding the game by controlling the movement of the object according to input operations and rules set forth, displaying means for displaying a screen of the situation seen from a certain viewpoint within the virtual space, distinguishing means for distinguishing the occurrence of a certain event in the game, data storing means for storing the data of objects into the memory in correspondence with the occurrence of the event, condition distinguishing means for continuing the game until a fixed condition is fulfilled from the occurrence of the event, reforming means for reforming the virtual space with data of the stored object when the fixed condition is fulfilled, and viewpoint position changing means for changing the position of the viewpoint after the reformation.

It is preferable if this condition distinguishing means is a timer that generates output when time no. 1 is elapsed from the occurrence of the event. In addition, it is preferable for data storing means to store data of the object into the memory when time no. 2, which is shorter than time no. 1, is elapsed after the occurrence of the event. Furthermore, it is preferable if this time no. 2 is set forth in correspondence with the object bearing the character of the game.

As a preferred embodiment of the present invention, there is the baseball game device. This baseball game device includes at least a showdown situation between the pitcher and batter, and comprises pitch distinguishing means for distinguishing the pitch thrown by the pitcher, timing means which starts timing in response to the pitch, and means for displaying the elapsed time on the screen until the pitch has been caught.

The screen display method of the game device of the present invention is a screen display method when the viewpoint is switched in the game device which is able to display from a different viewpoint in the situation of the game proceeded by the arrangement of objects within the virtual space, and advances the game for a short time with the present viewpoint when a specific event occurs in which the viewpoint should be changed, returns the time axis in the virtual space to for a certain time when the above short time has elapsed, and advances the game again by switching the above viewpoint to another viewpoint. It is desirable that this certain time is set forth in correspondence with the object bearing the character of the game.

As a preferred screen display method of the present invention, there is a screen display method of a baseball game device. This screen display method of a baseball game device is an display method of a screen in a baseball game device including a pitching screen in which the subject is the pitcher and batter, and displays the elapsed time, which is the time from when the pitcher throws the ball until such pitch has been caught, on the pitching screen.

The information processing device (game device) of the present invention comprises rhythm input means for inputting rhythm, rhythm storing means for storing in advance a specific rhythm and information in correspondence, distinguishing means for distinguishing whether or not the input rhythm and the stored rhythm coincide, and information outputting means for outputting the corresponding information in the event the input rhythm and the rhythm stored in advance coincide.

The information storage medium of the present invention stores the program to function a computer system as a game device etc.

BRIEF DESCRIPTION OF THE DRAWINGS

FIG. 15 is an explanatory diagram explaining the table (database) which stores the player's ability of each team.

DESCRIPTION OF THE PREFERRED EMBODIMENT

Figure 1:
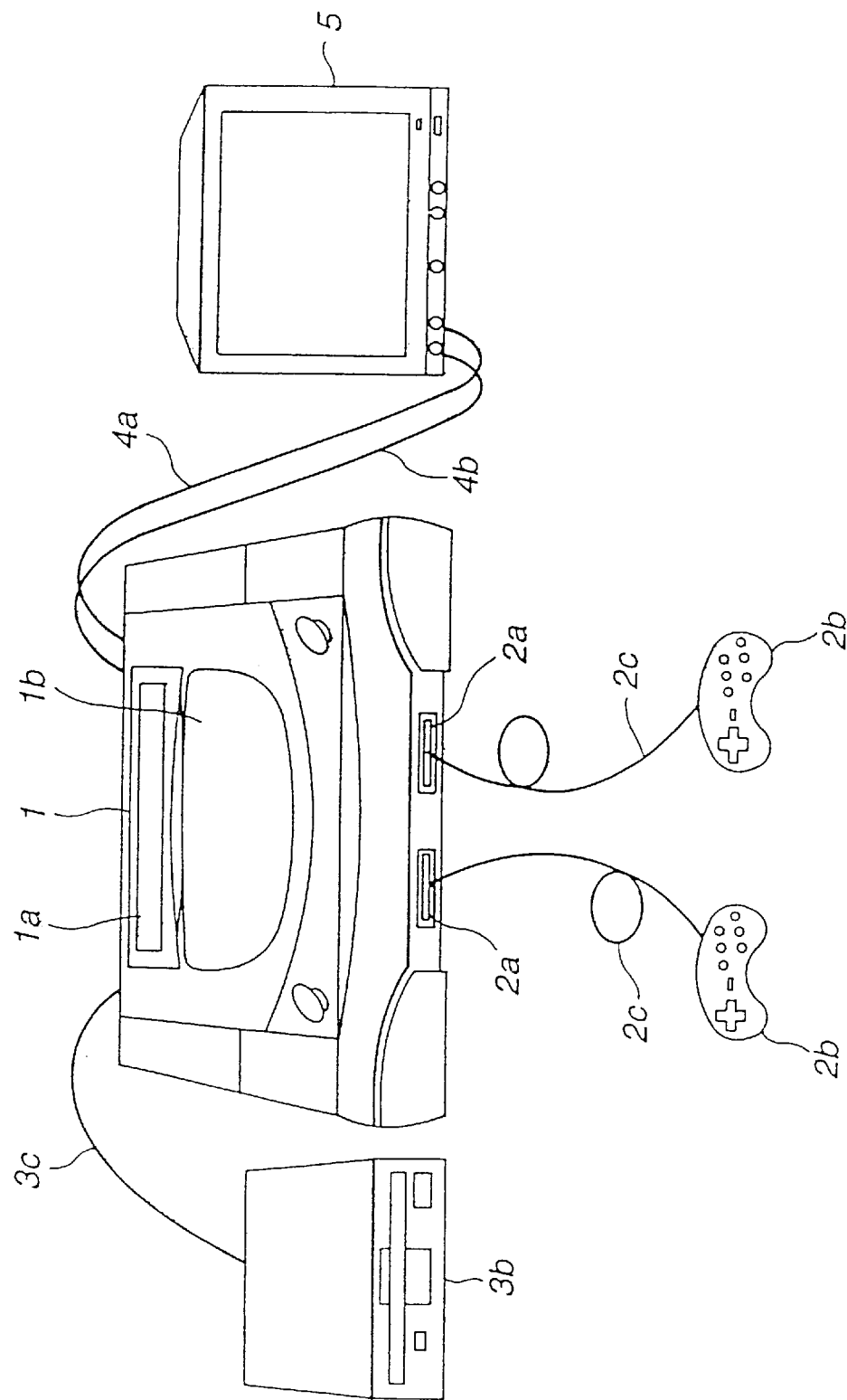
FIG. 1 is a perspective view explaining an example of the entire structure of the game device.

The embodiments of the present invention will be explained with reference to the drawings. FIG. 1 is an exterior view of the video game machine which uses the image processing device of one embodiment of the present invention. In this diagram, the video game machine main body 1 is roughly a box shape, and a baseboard etc. for game processing are provided therein. In addition, two connectors 2a are provided in front of the video game machine main body 1, and the pad 2b for game operation is connected to these connectors 2a via the cable 2c. When two players are to enjoy the game, two pads 2b are used.

On the upper part of the video game machine main body 1, a cartridge I/F1a for connecting the ROM cartridge and a CD-ROM drive 1b for reading in the CD-ROM are provided therewith. Though not shown in the diagram, a video output terminal and an audio output terminal are provided on the back of the video game machine main body 1. This video output terminal is connected to the audio input terminal of a TV receiver 5 via a cable 4a, and the audio output terminal is connected to the audio input terminal of the TV receiver 5 via the cable 4b. In this type of video game machine, by the user operating the pad 2b, the game may be played while watching the screen shown on the TV receiver 5.

Figure 2:
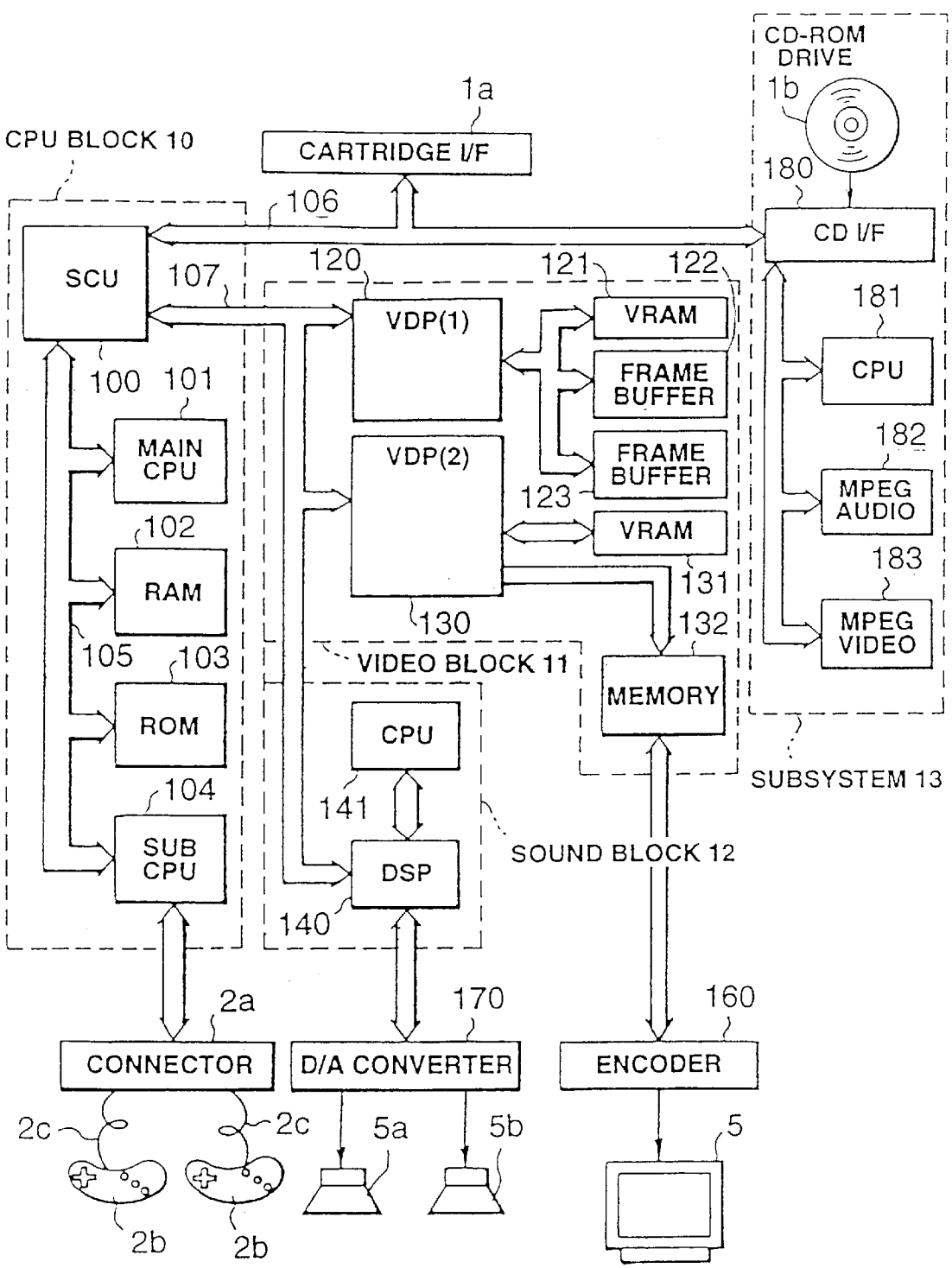
FIG. 2 is a block diagram explaining the system structure of the game device.

FIG. 2 is a block diagram showing the outline of the TV game machine of the present embodiment. This image processing device is structured with the likes of a CPU block 10 which implements the control of the entire device, a video block 11 which implements the display control of the game screen, a sound block 12 which generates sound effects etc., and a subsystem 13 which implements the read out of the CD-ROM.

The CPU block 10 is structured with the likes of a SCU (System Control Unit) 100, a main CPU 101, a RAM 102, a ROM 103, a cartridge I/F1a, a sub CPU 104, and a CPU buss 103. The main CPU 101 implements the control of the entire device. This main CPU 101 comprises therein a calculating function similar to a DSP (Digital Signal Processor) and is able to execute the application software at high speeds. The RAM 102 is used as the work area of the main CPU 101. In the ROM 103, an initial program etc., for the initialization processing is written therein. The SCU 100 implements smooth data input and output between the main CPU 101, the VDP 120, 130, the DSP 140, and the CPU 141 etc., by controlling the buss 105, 106, and 107. Furthermore, the SCU 100 comprises a DMA controller therein and is able to transmit sprite data in the game to the VRAM within the video block 11. By this, a high-speed implementation of the application software of games etc., is possible. The cartridge I/F1a is for inputting application software supplied in the form of a ROM cartridge.

The sub CPU 104 is the so-called SMPC (System Manager & Peripheral Control) and comprises functions such as gathering peripheral data from the pad 2b via the connector 2a according to the request from the main CPU 101. The main CPU 101 performs processing based on the peripheral data received from the sub CPU 104. A desired peripheral within a pad, a joystick, or a keyboard etc., may be connected to the connector 2a. The sub CPU 104 comprises functions of automatically recognizing the type of peripheral connected to the connector 2a (main body side terminal) and gathering peripheral data etc., according to the communication method in response to the type of peripheral.

The video block 11 comprises a VDP (Video Display Processor) 120 which performs the drawing of characters etc. made of polygon data of video games, and a VDP 130 which performs the drawing of the background screen, synthesizing of the polygon image data and background image, and clipping processing etc. The VDP 120 is connected to VRAM 121 and the frame buffer 122 and 123. The drawing data of polygons displayig the characters of video game machines are sent from the main CPU 101 to the VDP 120 via the SCU 100, and is written into VRAM 121. The drawing data written into the VRAM 121, for example, are drawn into the frame buffer 122 or 123 which are used for drawing in a format of 16 or 8 bit/pixel. The drawn data in the frame buffer 122 or 123 are sent to the VDP 130. Information that controls the drawing is given from the main CPU 101 to the VDP 120 via SCU 100. Then, the VDP 120 implements the drawing processing according to the above information.

A VDP 130 is connected to a VRAM 131, and it is structured so that the image data outputted from the VDP 130 is outputted to an encoder 160 via a memory 132. The encoder 160 generates image signals by adding synchronous signals etc. to the image data, and outputs to the TV receiver 5. Thereafter, the game screen is diaplaayed on the TV receiver 5.

The sound block 12 consists of a DSP 140 which performs sound synthesizing according to a PCM method or an FM method, and a CPU 141 which performs the control etc. of this DSP 140. The sound data generated by the DSP 140 is outputted to the speaker 5 after it is converted into a two channel signal by a D/A converter 170.

The sub system 13 consists of the CD-ROM drive 1b, a CD I/F 180, a CPU 181, an MPEG AUDIO 182, and an MPEG VIDEO 183 etc. This sub system 13 comprises functions which perform the read-in of application software supplied in a format of a CD-ROM and the reproduction of animations etc. The CD-ROM drive 1b is for reading in data from the CD-ROM. The CPU 181 performs processing of correcting mistakes of the read in data and the control etc. of the CD-ROM drive 1b. Data read in from the CD-ROM are supplied to the CPU 101 via the CD I/F180, the buss 106, and the SCU 100, and are used as application software. Furthermore, the MPEG AUDIO 182 and the MPEG VIDEO 183 are devices for restoring data compressed by the MPEG standards (Motion Picture Expert Group). By performing the restoration of the MPEG compressed data written into the CD-ROM using these MPEG AUDIO 182 and MPEG VIDEO 183, the reproduction of the animation becomes possible.

Figure 3:
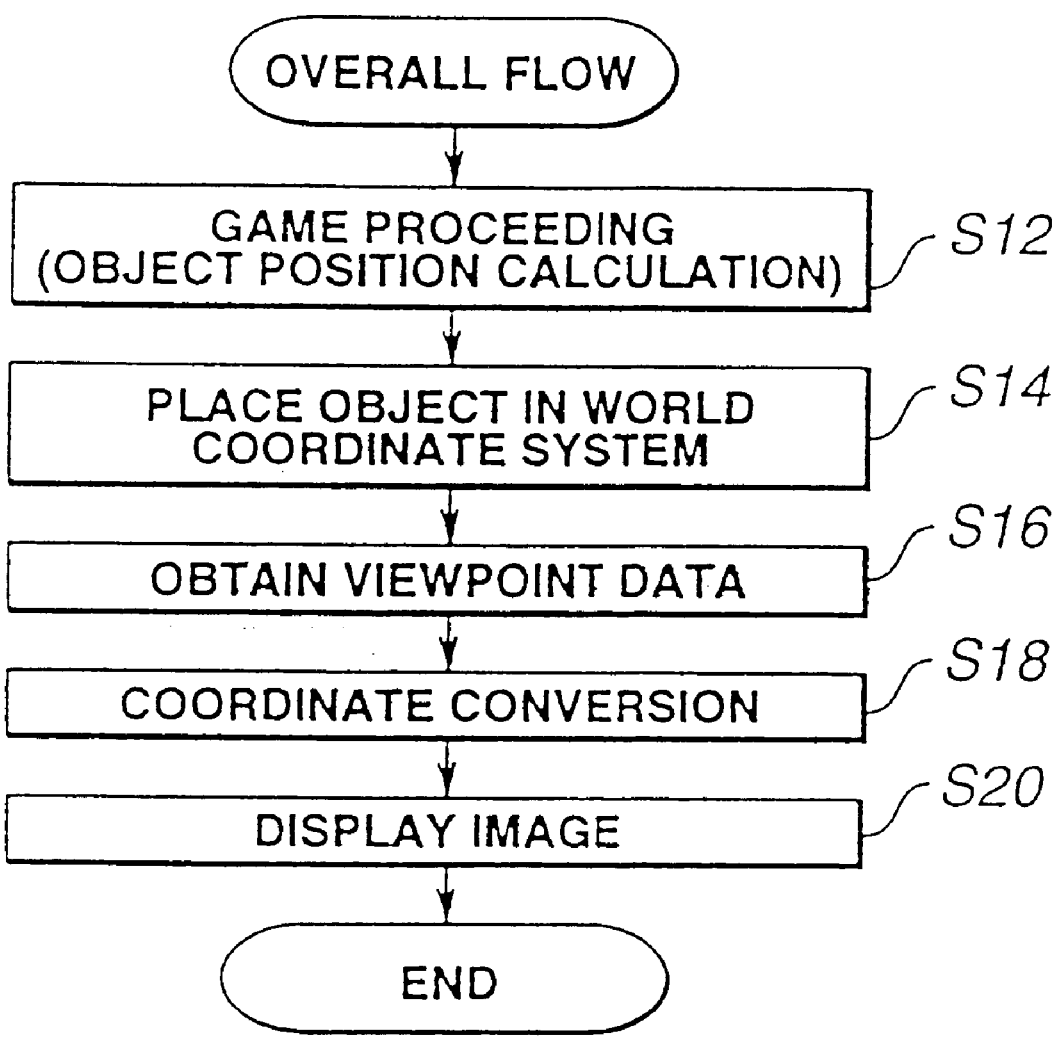
FIG. 3 is a flowchart schematically explaining the overall movement of the game device.

FIG. 3 is a flowchart schematically explaining the overall movement in the 3D (three-dimensional) game device.

Foremost, according to game programs and object data etc. which were introduced by the CD-ROM 1b and stored in the RAM 102, the movements of each character (people etc.) or the objects in the background are controlled. The position of each object is calculated according to the object's movement rule (motion model) prescribed for each object, and the position in the world coordinate system is calculated (S12). Each object is arranged in the virtual space of the world coordinate system that is formed within the CPU block 10 (S14). The position data of the viewpoint at this point in time is read in from the RAM 102 (S16). Data of each object arranged in the virtual space of the world coordinate system is converted to the viewpoint coordinate system. Furthermore, in order to display the object on the screen, clipping and perspective conversions etc. are performed to convert to the screen coordinate system so as to obtain image data (S18). The game screen is displayed by this image data being converted to a video signal and sent to the TV receiver 5. This type of game image formation processing is repeated in a frame period of the TV receiver, and is displayed as animation.

Figure 4:
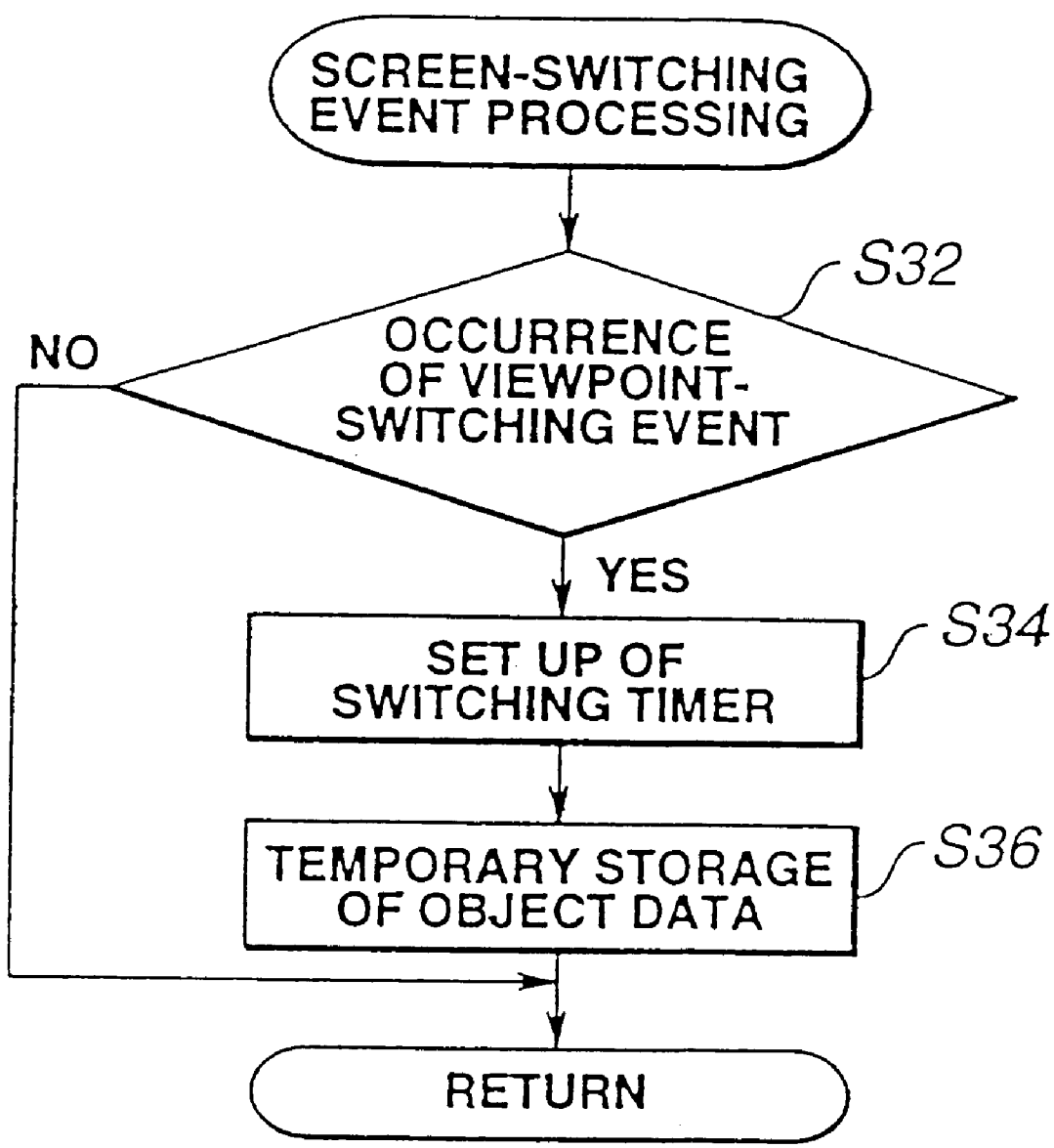
FIG. 4 is a flowchart explaining the storage processing of object data for returning the time axis of the game when a screen-switching event has occurred.
Figure 5:
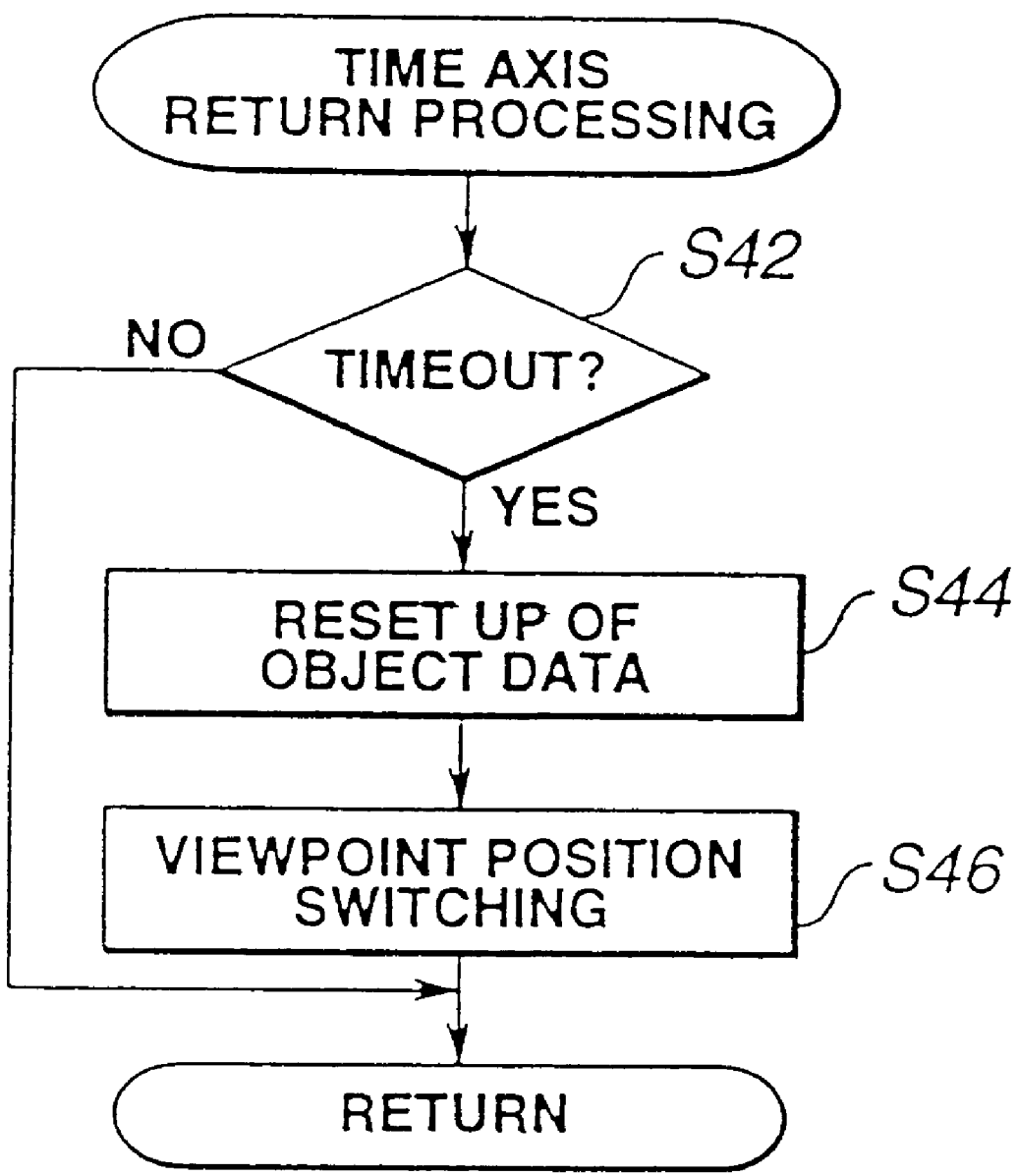
FIG. 5 is a flowchart explaining the processing for returning the time axis of the game.

FIGS. 4 and 5 are respective flowcharts explaining the important points of the present invention.

As explained above, in a 3D game, the view of the game may be changed by suitably switching the position of the viewpoint placed within the virtual space.

However, when the viewpoint position is switched during a game, there are cases in which the input operation of the game immediately after such switching may not be in time. This is because, as the game (simulation) itself in the virtual space is continuously advancing regardless of the switching of the screen, the appropriate operation of the pad 2b will always be required. However, as a substantial amount of time is required until necessary information from the switched screen is obtained and operation of the game pad 2b is judged and performed, the operation (response) is delayed.

Therefore, as in game devices that use highly efficient CPUs, if the progress of the game is not suspended even by the increase in the load of calculation processing when the screen is switched, the difficulty of the game substantially increases.

Thus, when switching the screen in the present invention, the player is given sufficient time for input operation by the time axis being returned and thereby able to continue enjoying the game.

As shown in FIG. 4, for example, a flag is set up when an event occurs in which the viewpoint during the 3D game should be switched, and the set up of the flag during the main program (not shown) is distinguished (S32). If an event occurs in which the viewpoint should be changed, the clocking of the switch timer built-in the CPU block 10 (or realized by the software) is commenced (S34). After the occurrence of the switching event with time t, this timer is used for the switching of the screen (viewpoint position) when certain time $\Delta t$ is elapsed. Next, in order to be able to return the time axis of the game from time t+$\Delta t$ to switching event occurrence time t, data in relation to the parameter etc. of each object's position or function at the present time (t) are stored in the RAM 102 (S36). Furthermore, by continuously storing object data into the RAM 102, object data of a discretionary time on the time axis may be read out thereafter.

Even after the occurrence of the viewpoint switching event, the game advances until time t+$\Delta t$ as is. Then, the player is slightly shown the progress of the game after the occurrence of the switching event. When the switching timer becomes time-out and the flag is set up, as shown in FIG. 5, it is distinguished during the main program (S42). In order to return the game to the time condition of time t, present data of each object within the virtual space is replaced by object data stored in the RAM 102, and the game is returned and resumed (S44). Thereafter, switching of the viewpoint position is performed (S46). Data of the viewpoint position is either changed to the position set forth in the program in advance, or to the position designated by the player (S46). By this, the screen is switched, and the game is continued with the switched screen.

Like this, after an event occurs in which the screen should be switched, the screen is switched upon returning the time axis of the game to the time of the occurrence of the event after advancing the game for a certain time and showing the player the game proceeds. Thereafter, as the game is advanced again from a slightly previous point, the player is able to continue the game with the switched screen with sufficient time to a certain extent.

Figure 6:
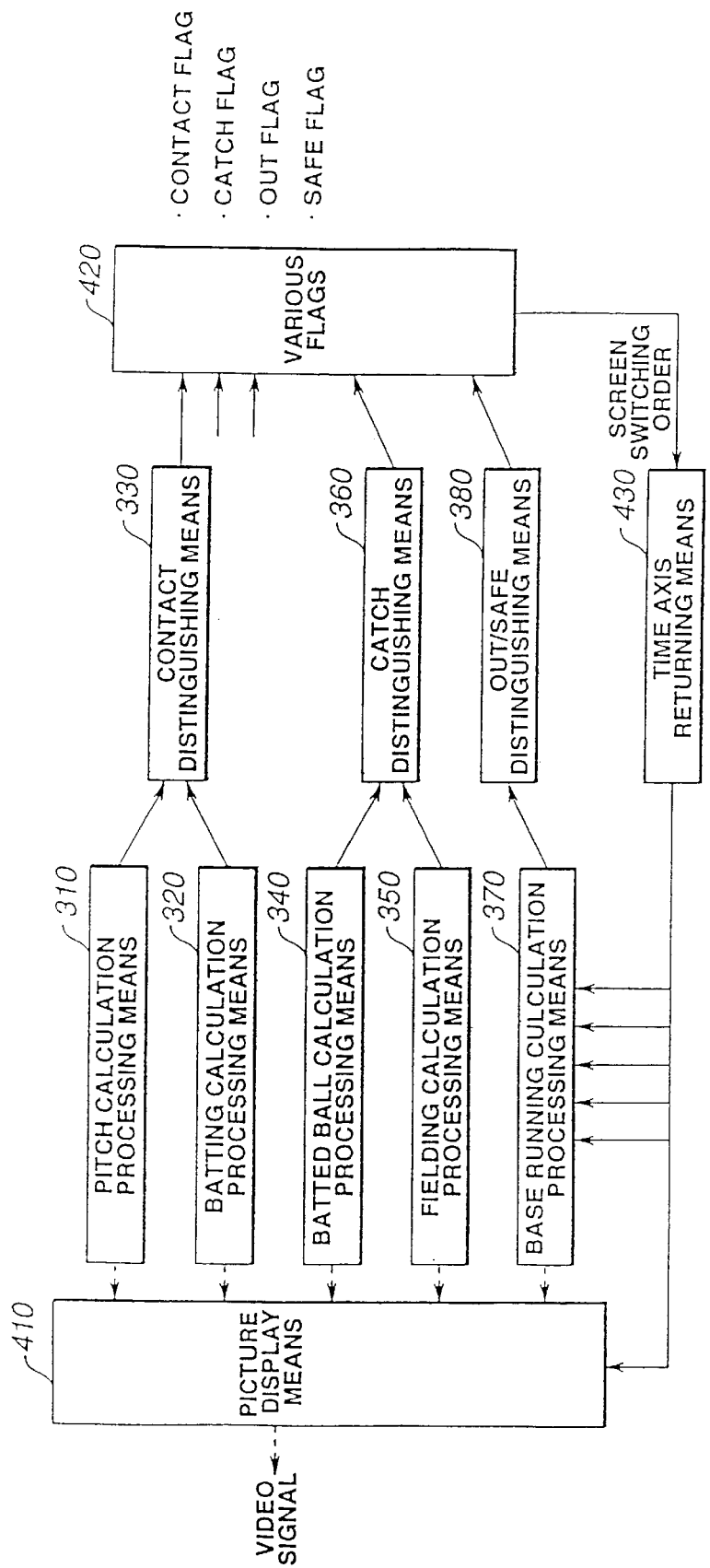
FIG. 6 is a functional block diagram explaining an example of simulation means of various objects in the baseball game.

Next, the case in which the present invention is applied to a baseball game will be explained. FIG. 6 is a functional block diagram explaining an example of the calculation processing of the object in the game. In the same figure, a pitch calculation processing means 310 simulates the path of the ball object thrown by the pitcher. A batting calculation processing means 320 simulates the path of the bat object swung by the batter.

A contact distinguishing means 330 distinguishes whether or not the bat hit the ball by checking the path of the ball object and the bat object. If the bat hit the ball, a contact flag is set up and the occurrence of the contact event is set up in a various flag set up section 420.

Figure 13:
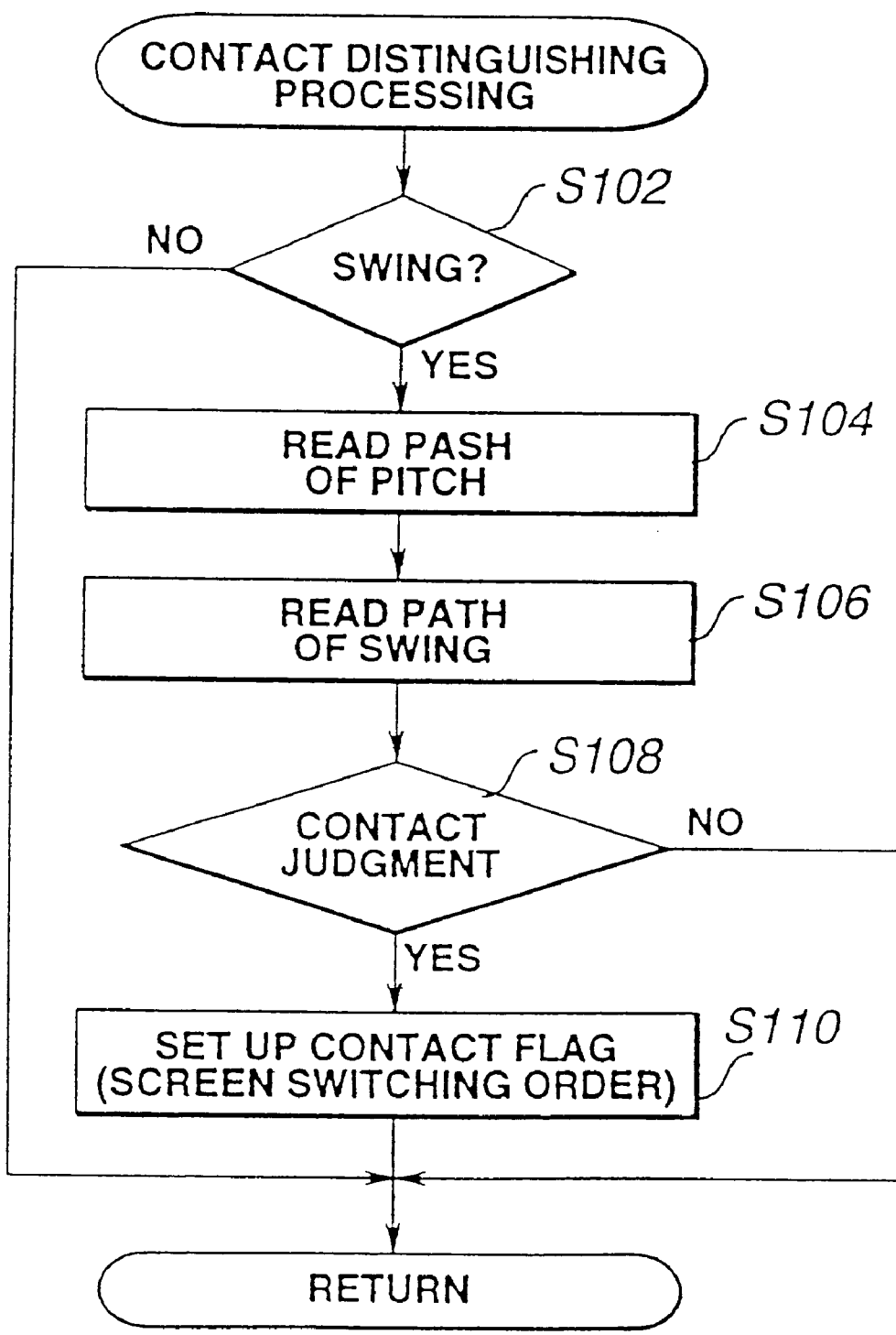
FIG. 13 is a flowchart explaining the processing for distinguishing the contact of the swing.
Figure 14:
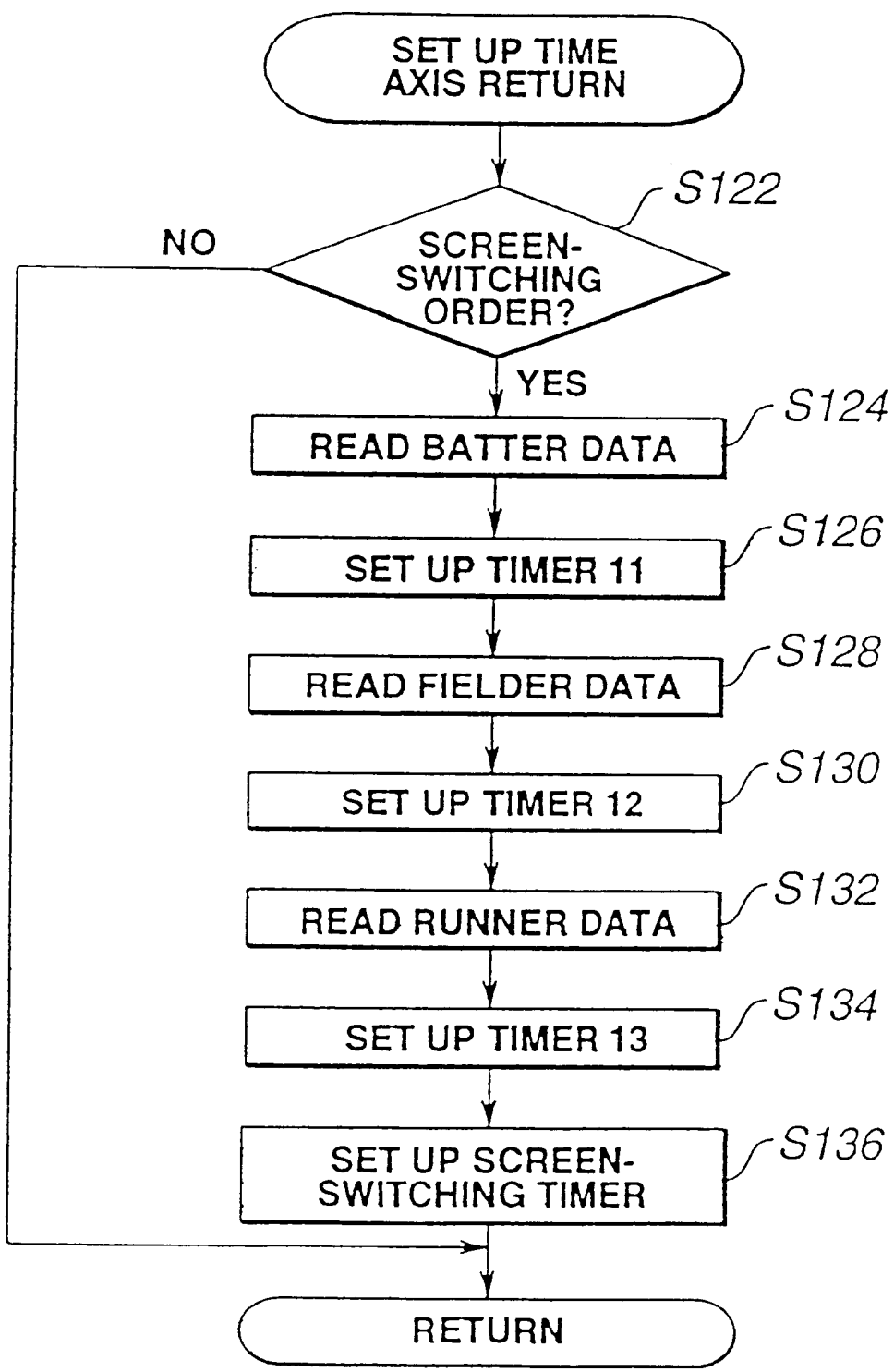
FIG. 14 is a flowchart explaining the processing for establishing the return time of the object's time axis when the screen is switched in the baseball game.

FIG. 13 is a flowchart explaining an example of the movement of the contact distinguishing means 330. This means distinguishes whether or not the input batter has swung by the player's operation of the pad 2b (S102). If swung, the thrown path of the ball object is read (S104). The swing path of the bat object is read (S106). Both paths are checked and the distinction is made of whether or not the bat hit the ball (S108). If hit, the contact flag is set up. This will become the screen switching order to be explained afterwards (S110).

In correspondence with the occurrence of the contact event, a batted ball calculation processing means 340 calculates the flight direction of the ball from the path of the ball object and the rotation path of the bat object, and simulates the flight of the ball by setting forth the parameter of the ball flight function. In correspondence with the set up of the contact flag, a fielding calculation processing means 350 moves the fielder object from the current fielding position towards the predicted path of the ball. The speed of this movement is affected by the ability parameter of a certain player. A catch distinguishing means 360 checks the path of the ball object and the path of the fielder object and determines whether or not the fielder has caught the ball. If caught, the catch flag is set up in the flag set up section 420. A base running calculation processing means 370 moves the runner object towards first base in correspondence with the set up of the contact flag. The movement speed of the batter object is affected by the ability parameter of a certain player. An out/safe distinguishing means 380 checks the fielder's catch of the fly ball, or the throw to first base after catching a grounder with the batter object's base running to first base and distinguishes whether it is out or safe. By the result of the distinction, the flag set up section 420 sets up an out flag or a safe flag.

The pitch calculation processing means 310, the batting calculation processing means 320, the batted ball calculation processing means 340, the fielding calculation processing means 350, and the base running calculation processing means 370 respectively send each position data of the thrown ball object, bat object, batted ball object, fielder object, and runner object to an image displaying means 410. The image displaying means 410 places each object in the virtual space and draws the 3D image, then forms the video signal and supplies it to the TV receiver. Each of the calculation processing means mentioned herein are explanations of only portions of the various object calculation processing means in a baseball game, which are realized within the CPU block 10. Furthermore, the function of the image displaying means 410 is principally realized in the video block 11.

A time axis returning means 430 is for returning the time axis of the game when changing the viewpoint position in the above coordinate conversion (S18). In response to an occurrence of an event such as the set up of the contact flag in which the screen should be changed (screen switching order), this means temporarily stores object data of the path calculation (simulation) processing means of various objects, and instructs the re-set up of the above data after the elapse of a certain time as well as the change of the viewpoint. The time axis returning means 430 is realized within the CPU block 10.

Specific movement examples of the time axis returning means 430 will be explained with reference to FIGS. 7 to 12.

Figure 7:
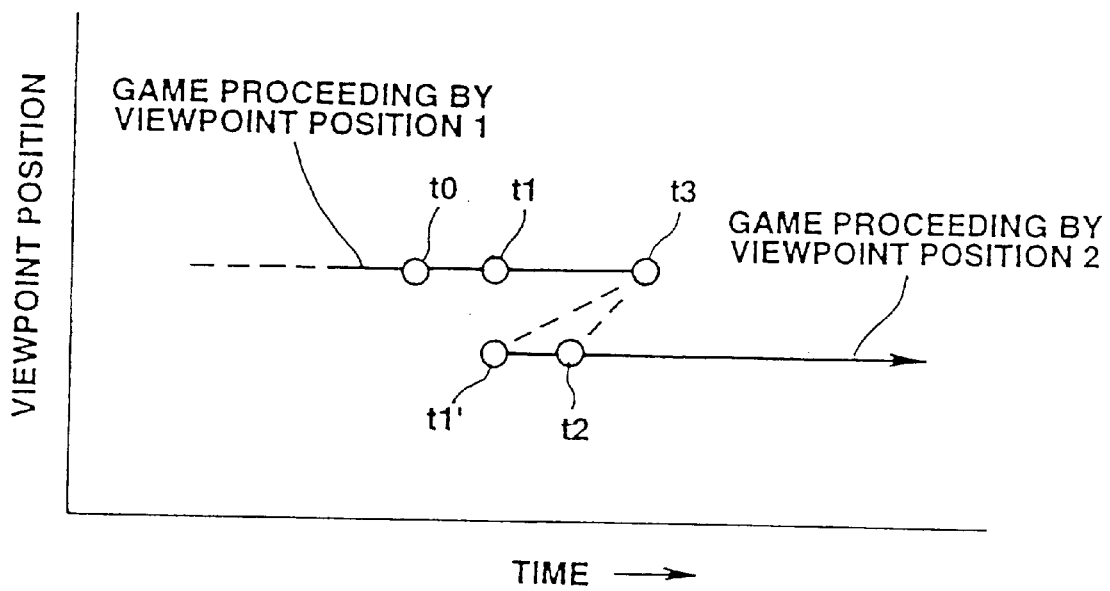
FIG. 7 is an explanatory diagram explaining the viewpoint position switching and the return of the time axis of the game.
Figure 8:
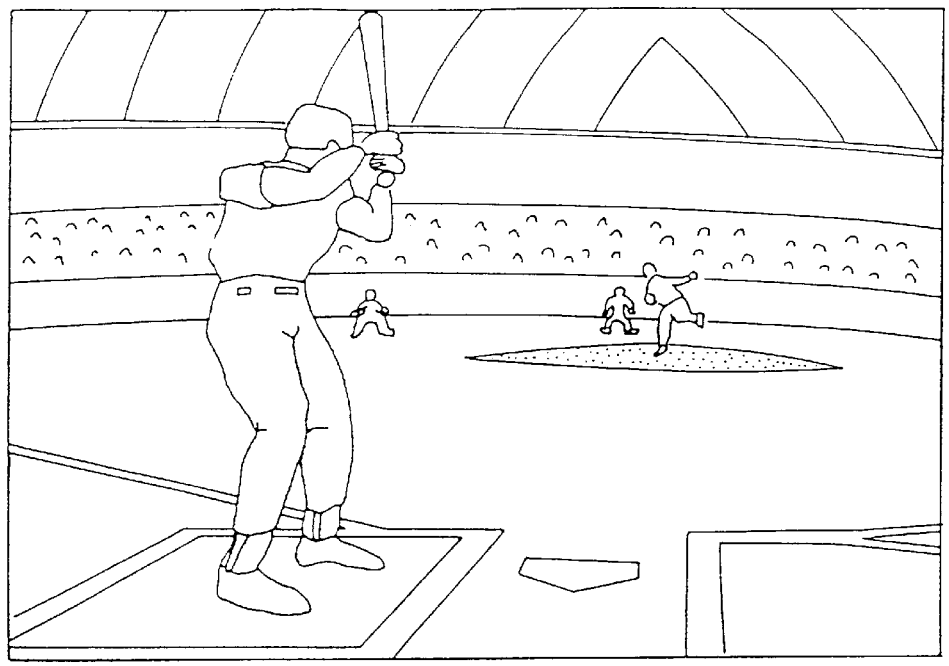
FIG. 8 is an explanatory diagram explaining an example of a pitching screen in the baseball game.
Figure 9:
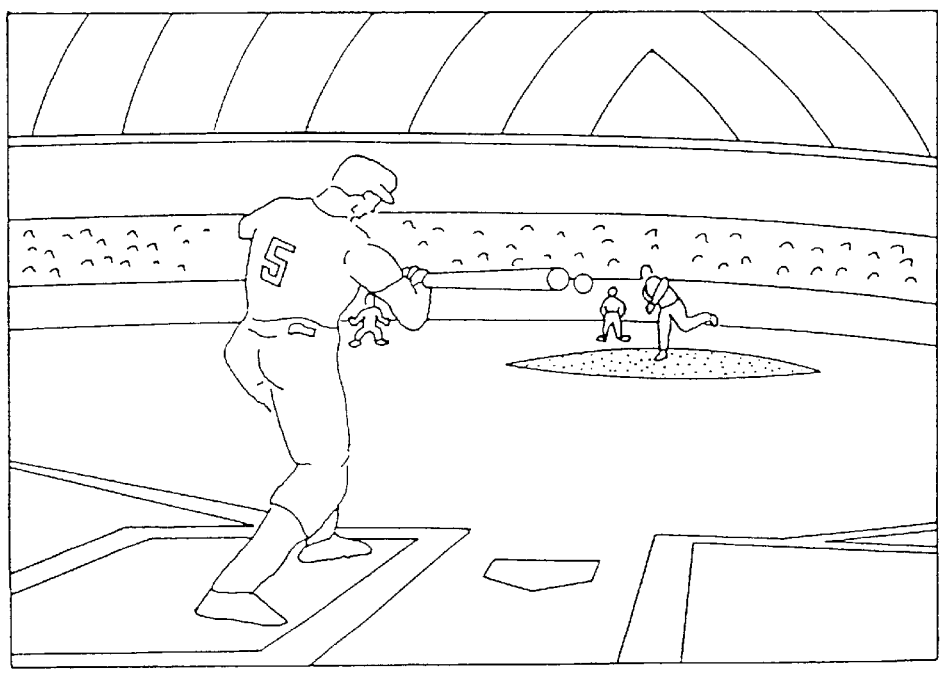
FIG. 9 is an explanatory diagram explaining an example of a pitching screen in the baseball game.
Figure 10:
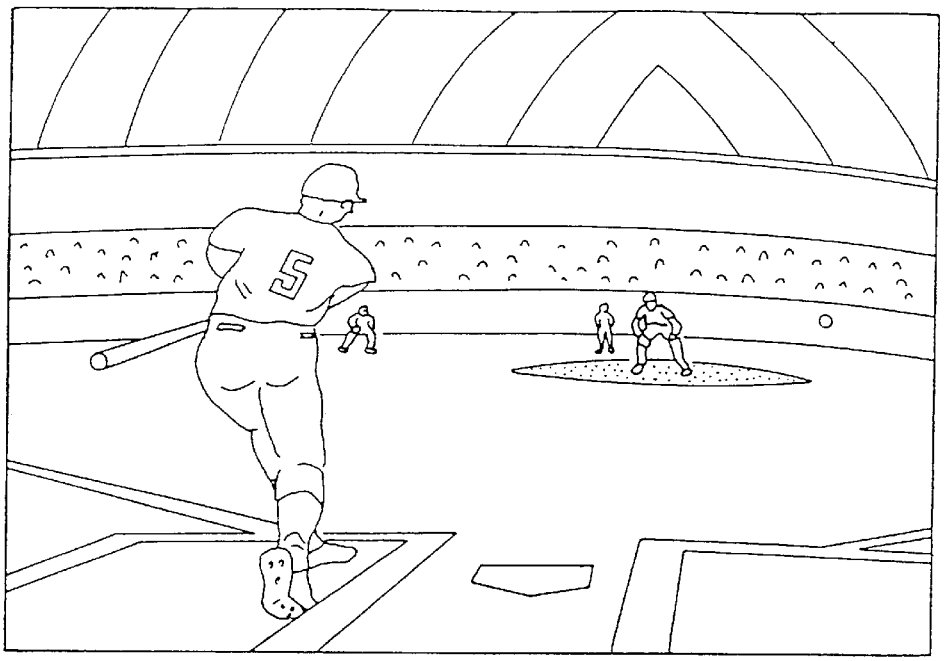
FIG. 10 is an explanatory diagram explaining an example of a pitching screen in the baseball game.
Figure 11:
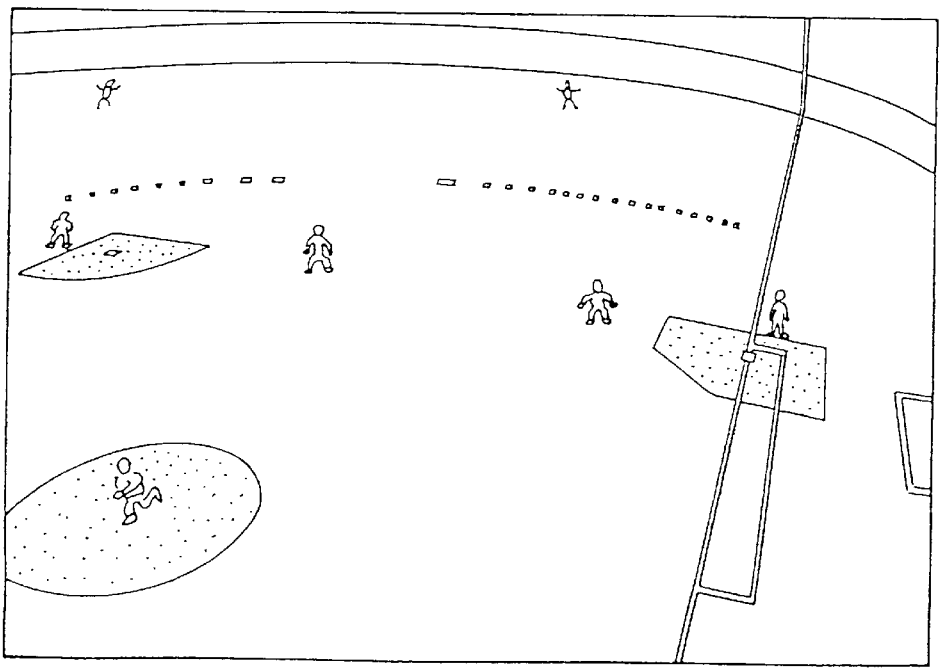
FIG. 11 is an explanatory diagram explaining an example of the time axis being returned from the pitching screen and switched to the fielding screen.
Figure 12:
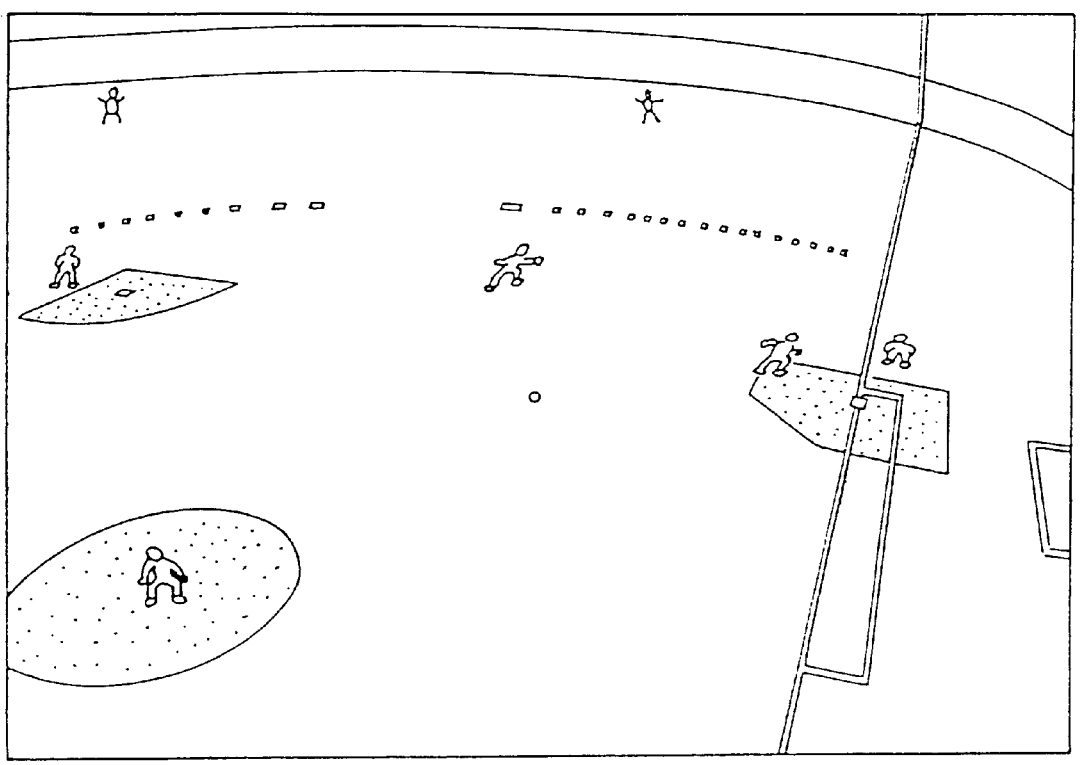
FIG. 12 is an explanatory diagram explaining other examples of the time axis being returned from the pitching screen and switched to the fielding screen.

FIG. 7 is an explanatory diagram explaining the viewpoint position and the game progress situation. Foremost, a screen in which the subject is the showdown between the batter and pitcher (pitching screen) shown from the viewpoint position 1 behind the catcher is displayed. AS shown in FIG. 8, the pitcher throws the ball at time t0. The batter hits the ball at time t1 (FIG. 9). The ball is hit between first and second base at time t3 (FIG. 10). The time axis of the game is returned to time t1', the viewpoint is switched to a viewpoint in the sky at time t1, and the game advances with a screen in which the subject is fielding (fielding screen) (FIG. 11). The degree of the return of the time axis may be changed by the fielding ability of the player or the return time set up by the player. For example, it is possible to return to the screen of time t2, which is between time t1 and time t3 (FIG. 12). By this, it is possible to provide the player with sufficient time after the screen is switched.

Next, the movement of the time axis returning means 430 when returning the time axis of each object with consider-ation to the individual ability of the player is explained with reference to the flowcharts shown in FIGS. 14 to 19.

Foremost, when the contact flag, which is a screen switching order, is set up (S122), the batter's hitting power data is read. FIG. 15 is the database wherein the ability of each player is stored, and it is loaded from the CD-ROM 1b then stored in the RAM 102 (S124). For example, if the batter is player A from team X, in order to set forth the position of the batted ball after the screen is switched, timeout time $\Delta t'$ in response to hitting power 5 is set up in built-in timer 11 (not shown) (S126). If the hitting power is great and the batted ball is moving fast, there will be less time for the player after the screen is switched, thus, it is preferable to increase the returning amount of the time axis of the batted ball. This may be performed by the set up of timeout time $\Delta t'$. The same may be said for the following player's individual abilities such as for running. From the database, running ability data of a player from team Y who is in the direction of the path of the batted ball is read (S128), and timeout time $\Delta t''$ is set up in response to the running ability (S130). The running ability of the runner data (in this case batter A) is read from the database (S132), and timeout time $\Delta t'''$ in response to the running ability 2 is set up to the built-in timer 13 (not shown) (S134). Like this, after setting the timer of each object (or main objects) which comes into view, timeout time $\Delta tx$ of the screen switching timer (not shown) is set up (S136). The screen-switching timer is for setting the time until the screen is switched from the occurrence of the screen-switching event, and the set up time $\Delta tx$ (=t3−t1) of the timer is, for example, 2 seconds. The set up time of $\Delta t'$, $\Delta t''$, $\Delta t'''$, or timers 11 to 13 are shorter than the screen switching timer's set up time of $\Delta tx$.

Furthermore, the screen-switching event is not limited to the contact judgment. For example, it could be after the batted ball is in the air or at the starting time of the bat swing, so various points may be used as the timing of switching.

Figure 16:
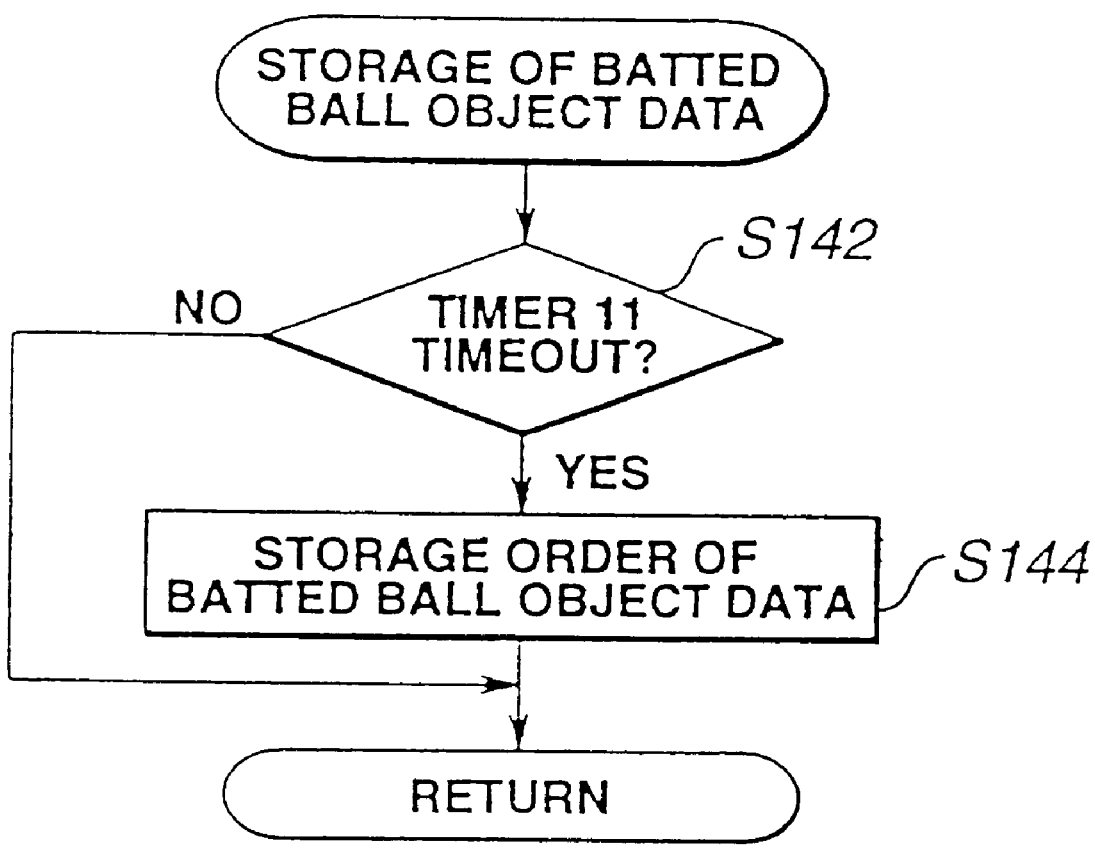
FIG. 16 is a flowchart explaining the storage of the batted ball object data.

As shown in FIG. 16, if the timeout of the timer 11 is distinguished during the main program by a flag set up of the same timer (S142), the batted ball object data, which the batted ball calculation processing means 340 is calculating at the time of t1+$\Delta t'$ on the time axis, is stored in the RAM 102 (S144).

Figure 17:
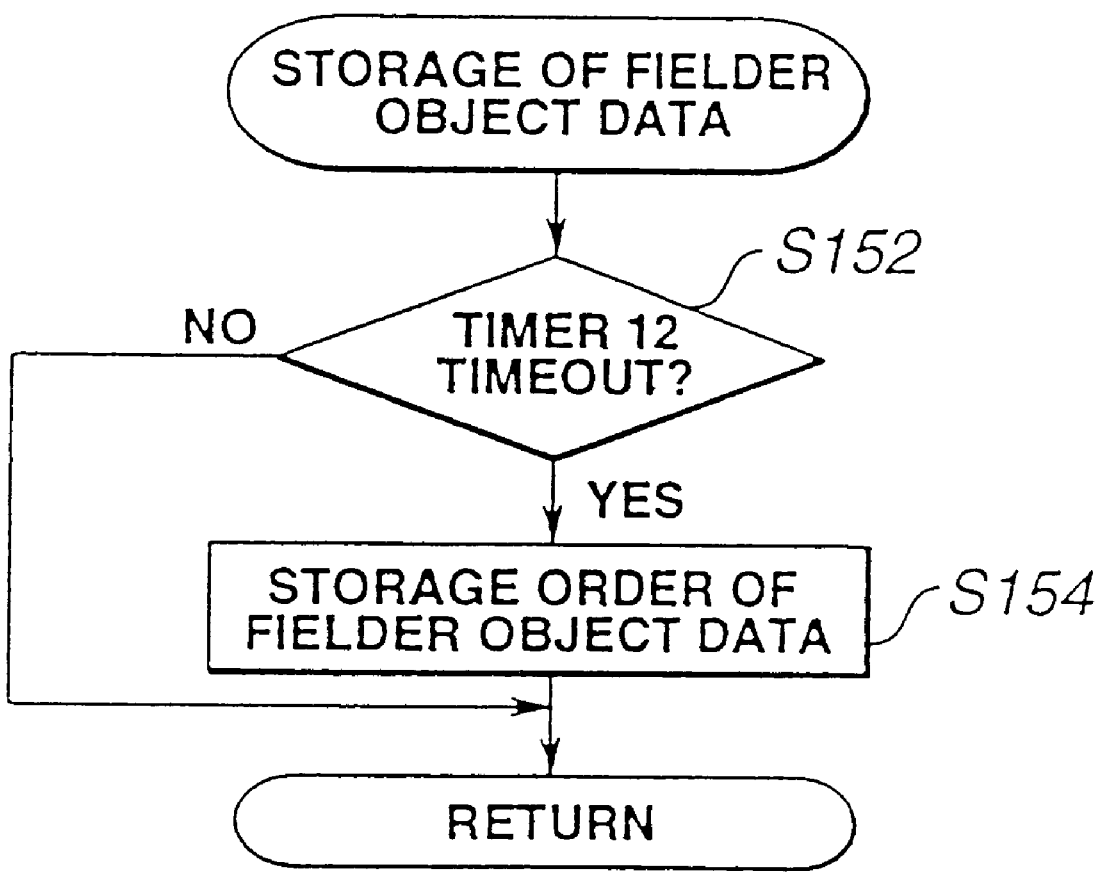
FIG. 17 is a flowchart explaining the storage of the fielder object data.

As shown in FIG. 17, if the timeout of the timer 12 is distinguished during the main program by a flag set up of the same timer (S152), the fielder object data, which the fielding calculation processing means 350 is calculating at the time of t1+$\Delta t''$ on the time axis, is stored in the RAM 102 (S154).

Figure 18:
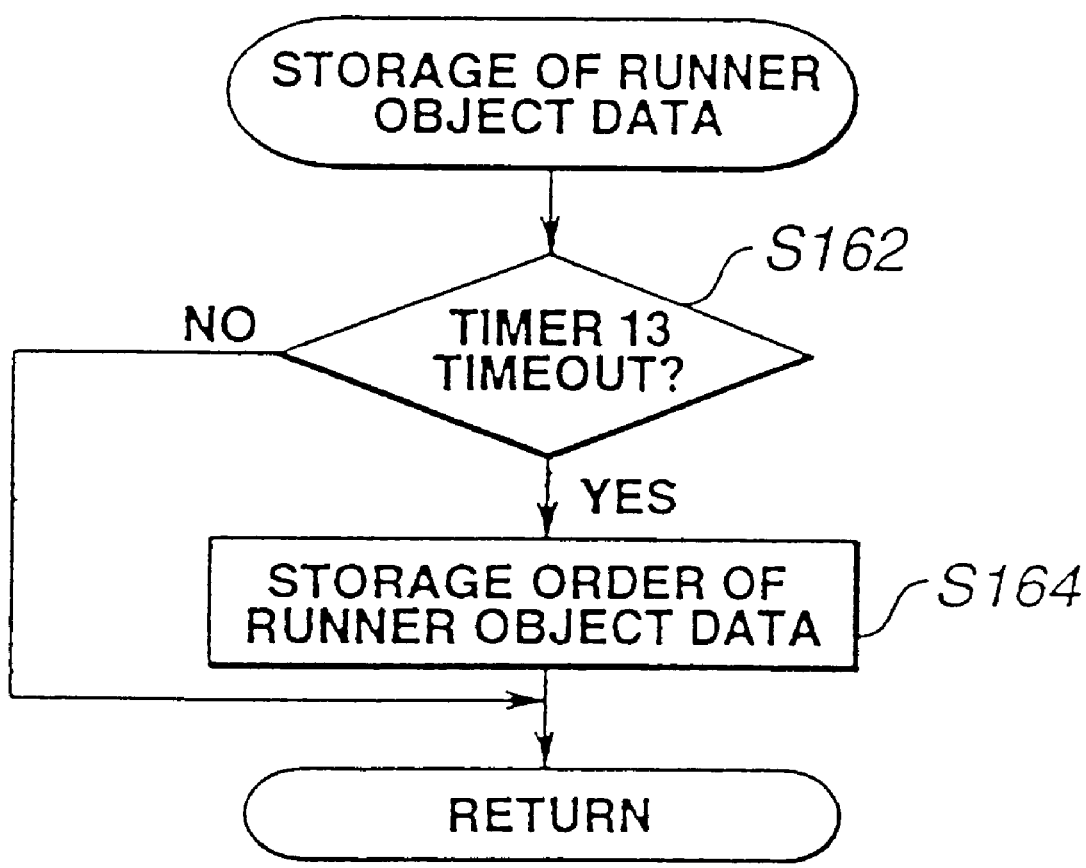
FIG. 18 is a flowchart explaining the storage of the runner object data.

As shown in FIG. 18, if the timeout of the timer 13 is distinguished during the main program by a flag set up of the same timer (S162), the batted ball object data, which the base running calculation processing means 370 is calculating at the time of t1+$\Delta t'''$ on the time axis, is stored in the RAM 102 (S164).

Like this, if a viewpoint (screen) switching event occurs, object data is temporarily saved in the position on the time axis set forth for each object.

Simulating calculation is continued even after the temporary storage of the object data of each calculation processing means, and the game is advanced.

Figure 19:
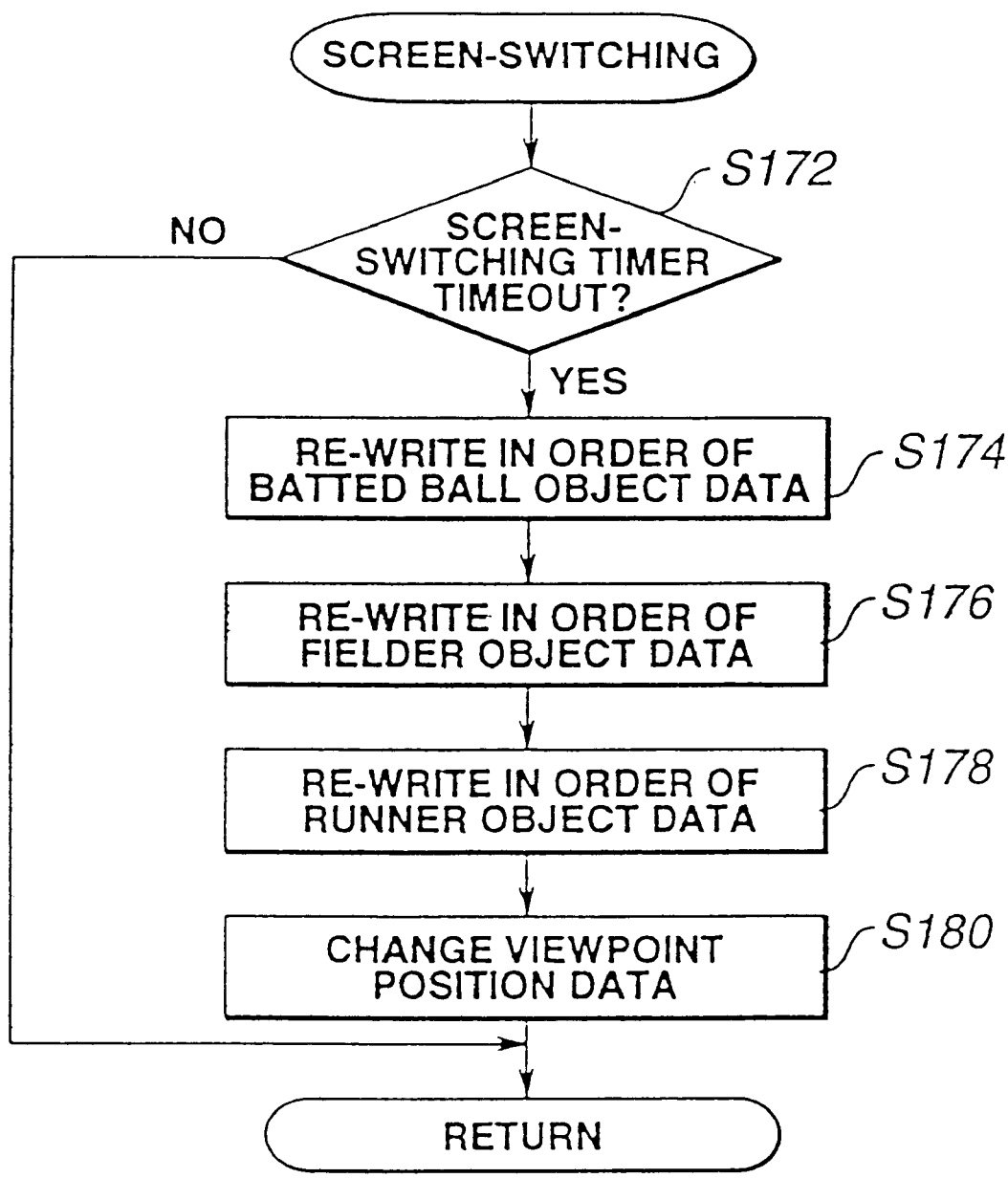
FIG. 19 is a flowchart explaining the switching of the screen.

Next, as shown in FIG. 19, if the timeout of the screen-switching timer is distinguished during the main program by a flag set up of the same timer (S172), the write-in of object data temporarily stored in the batted ball calculation processing means 340 is performed, and the batted ball object is returned to the position of t1+$\Delta t'$ on the time axis and simulation is continued (S174). The write-in of object data temporarily stored in the fielding calculation processing means 350 is performed, and the fielder object is returned to t1+Δt''' on the time axis and simulation is continued (S176). The write-in of object data temporarily stored in the base running calculation processing means 370 is performed, and the runner object is returned to t1+Δt''' on the time axis and simulation is continued (S178). After the re-set up of the position of each object is completed, the image displaying means 410 is ordered to change the data of the viewpoint position. By this change order of the viewpoint position, the fielding screen which has been returned from the pitching screen (FIGS. 8 to 10), for example, is switched to a screen of contact time t1 (FIG. 11), and the game is continued (S180).

As explained above, when switching the screen, as well as being able to set the degree of return of the time axis for each object, it is also possible to return the time axis of each object in uniform by setting the time of each timer the same.

Moreover, in the above example, although the screen was switched by the timer output, it is not limited to such method. For example, it is possible to use the value of the distance of the batted ball or the size of the batted ball on the screen etc. It is further possible to switch the camera when the distance of the batted ball reaches a certain value set forth in the program after judging the position coordinates of the batted ball, or when the size of the batted ball on the batting screen as shown in FIGS. 8 or 9 becomes smaller than a certain value set forth in the program.

Figure 20:
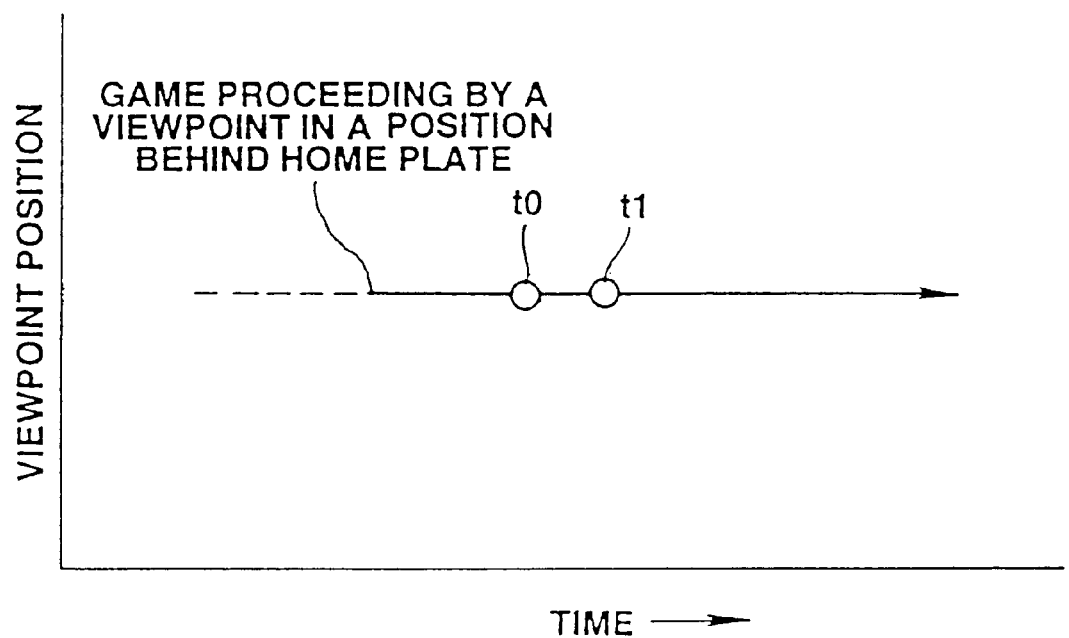
FIG. 20 is an explanatory diagram of displaying the elapsed time on the screen.

FIG. 20 shows an example of a measure to make other games easier, which explains an example of displaying the elapsed time from time t0 on a portion of the screen from time t0 to time t1 during the game.

Figure 21:
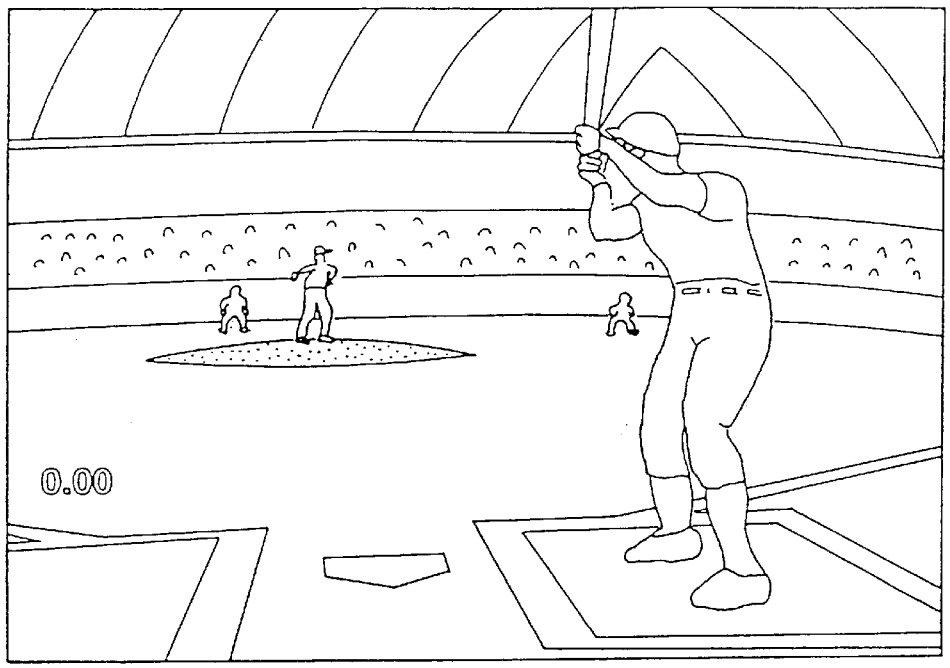
FIG. 21 is an explanatory diagram showing an example of displaying the start time on a portion of the screen.
Figure 22:
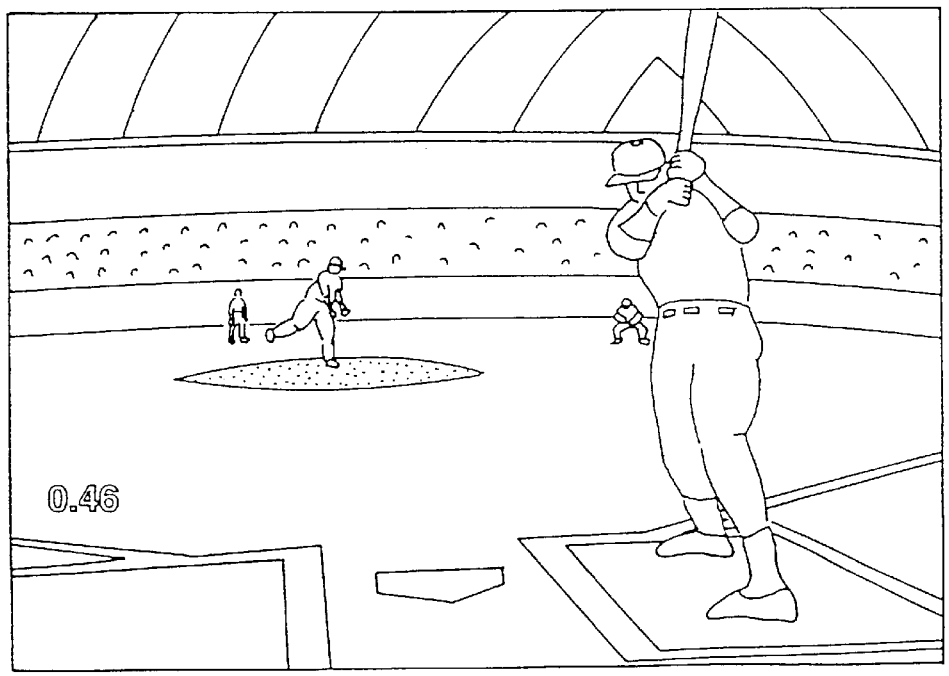
FIG. 22 is an explanatory diagram showing an example of displaying the elapsed time on a portion of the screen.
Figure 23:
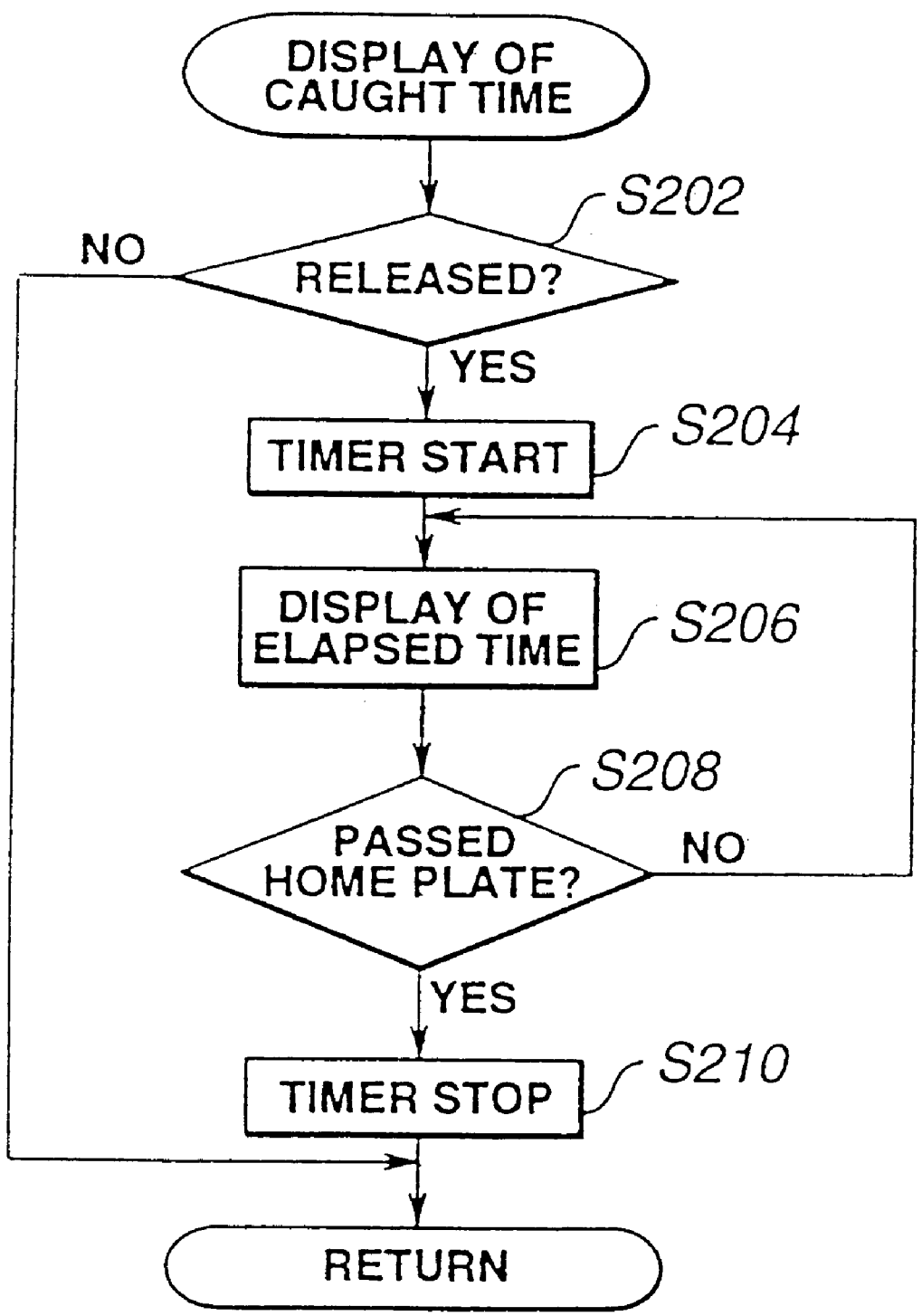
FIG. 23 is a flowchart explaining an example of displaying the time until the thrown pitch has been caught.

FIGS. 21 to 23 is an explanation of when the above example is applied to a baseball game (batting).

In these examples, by displaying the time until the ball thrown by the pitcher passes home plate (the time from the throw to the catch) on the pitching screen, it makes it easier for the player to time the swing operation of the batter.

That is, in a game program not shown, a flag is set up in a timing when the pitcher releases the ball (when the start of pitching has been instructed, in other words, when the pitching button is pushed or when the pitcher starts the pitching motion), and if this is distinguished during the main program (S202), the timer is started (S204) and the elapsed time after the release is displayed on the screen (S206). FIG. 21 shows an example of a screen at the moment of the release of the ball, and this is when the timer starts from "0.00 seconds." The timer display is repeated until the ball passes through home plate (S206, S208: No). When the ball passes through home plate (S208: Yes), the timer is stopped, and the display of the time required for the ball to pass between the pitcher's plate and home plate "0.46 seconds" is maintained for a certain time. This example is shown in FIG. 22 (S210).

The judgment of whether the ball has passed home plate, for example, may also be distinguished by the simulation of the pitch calculation processing means 310, or by the ball speed and the distance between the pitcher's plate and home plate etc.

Like this, as the ball approaching elapsed time after the pitch is displayed on the screen, the player may perform the operation of the swing with reference to such time.

Incidentally, there are game devices that enable usage by only specific players, or are made to input passwords or secret commands from the operation pad 2b (or with keyboard input devices etc. (not shown)) in order to change to a special operation mode not disclosed to the public. Whether or not the combination of the input chord group is a combination of specific chords stored in advance is distinguished, which enables the use of the game device or interprets it as a special order to the CPU.

However, with this type of input method in a password format, an input device provided with a certain number of inputs in order to generate a plurality of types of chords will be required. This is not preferable since it limits the format of the input device. In addition, the player must accurately remember a series of numbers or symbols etc.

Thereby, the following invention utilizes rhythm input to obtain the same functions as passwords and specific function keys.

Figure 24:
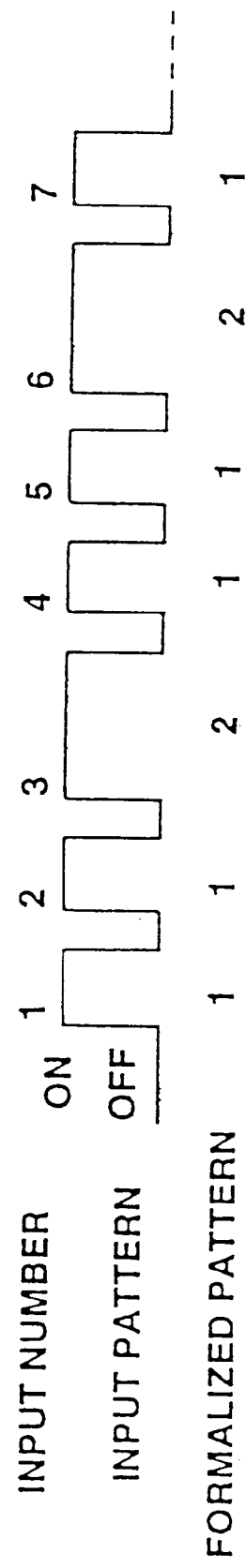
FIG. 24 is an explanatory diagram of the input signal for explaining the rhythm input.
Figure 25:
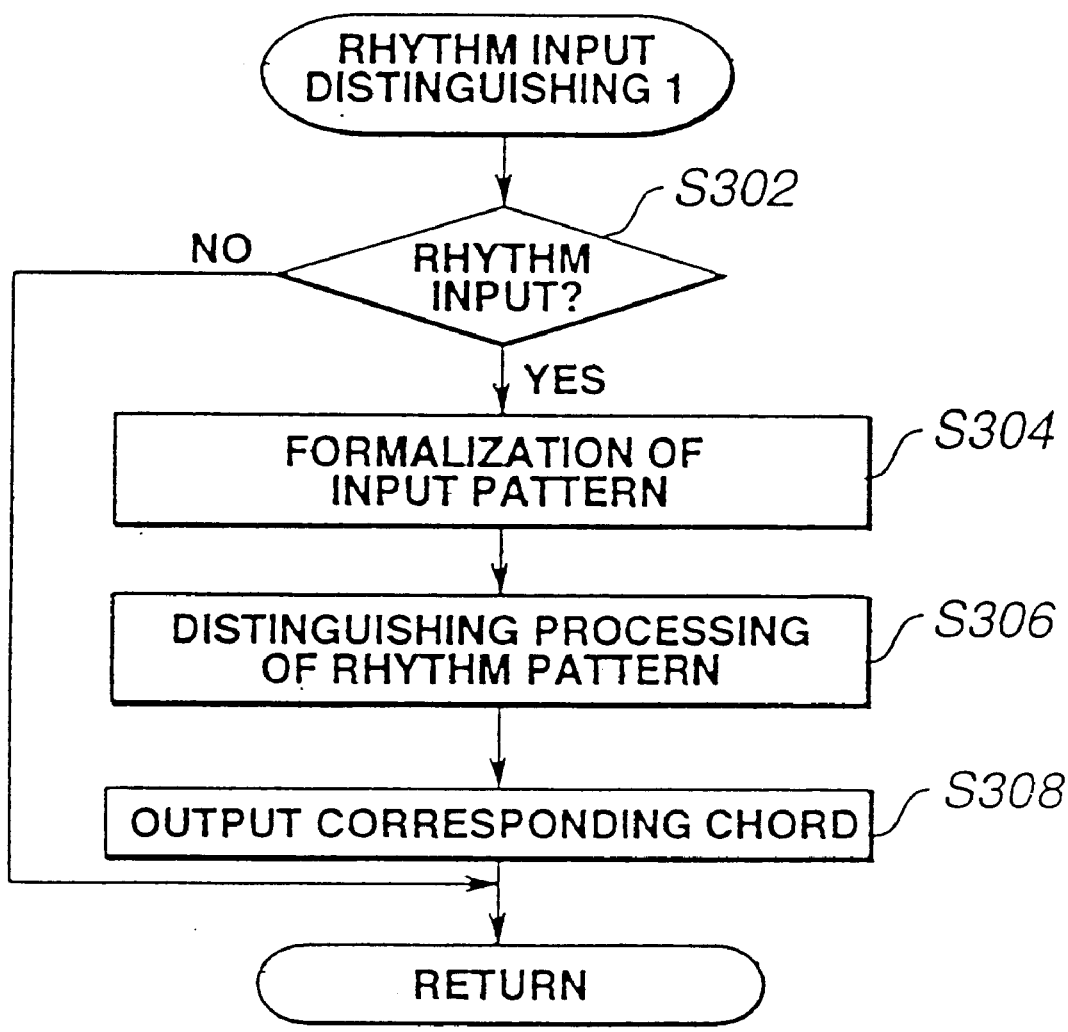
FIG. 25 is a flowchart explaining the algorithm which determines the rhythm input.

As shown in FIG. 24, if a group of operations is input with a specific key or stick etc. when the game device is in a condition of receiving rhythm input, rhythm input distinguishing processing shown in FIG. 25 is performed.

Foremost, the input number and the on time of each operation of the rhythm input data are sampled by the sub CPU 104 and stored in the RAM 102. If the main CPU 101 distinguishes that the rhythm input has been performed (S302), it calculates the total operation time by adding the on time of each operation (S304). For example, if the input number is 13, and the width of the input signal pattern is a rhythm of "short, short, long, short, short, long, short, short, short, short, short, short, short," the input signal pattern is formalized with the signal width (average value) of the short width signal as the basis, and the formalized pattern is obtained. In the example of the input signal above, the formalized pattern is "1121121111111" (3-3-7 rhythm) (S304). This formalized pattern (rhythm pattern) is compared with the rhythm pattern previously stored in the database, and the operation order etc. in correspondence with the 3-3-7 rhythm is selected (S306). The selected chord information is provided to the above program by the so-called communication between programs (S308). For example, in a baseball game device, it may be used for a hidden command in order to perform a game proceeding with specially selected members. Furthermore, for the so-called printing devices (game devices which produce stickers of photographs), for example, it may be used as a hidden command etc. for producing a sticker of a person's photograph in a sepia color.

This kind of corresponding combination of rhythm and chords may be provided as a database in advance, or by the learning mode established in the game device, it may also construct the database to each rhythm by performing processing of corresponding a specific order chord to the rhythm inputted by the player.

Figure 26:
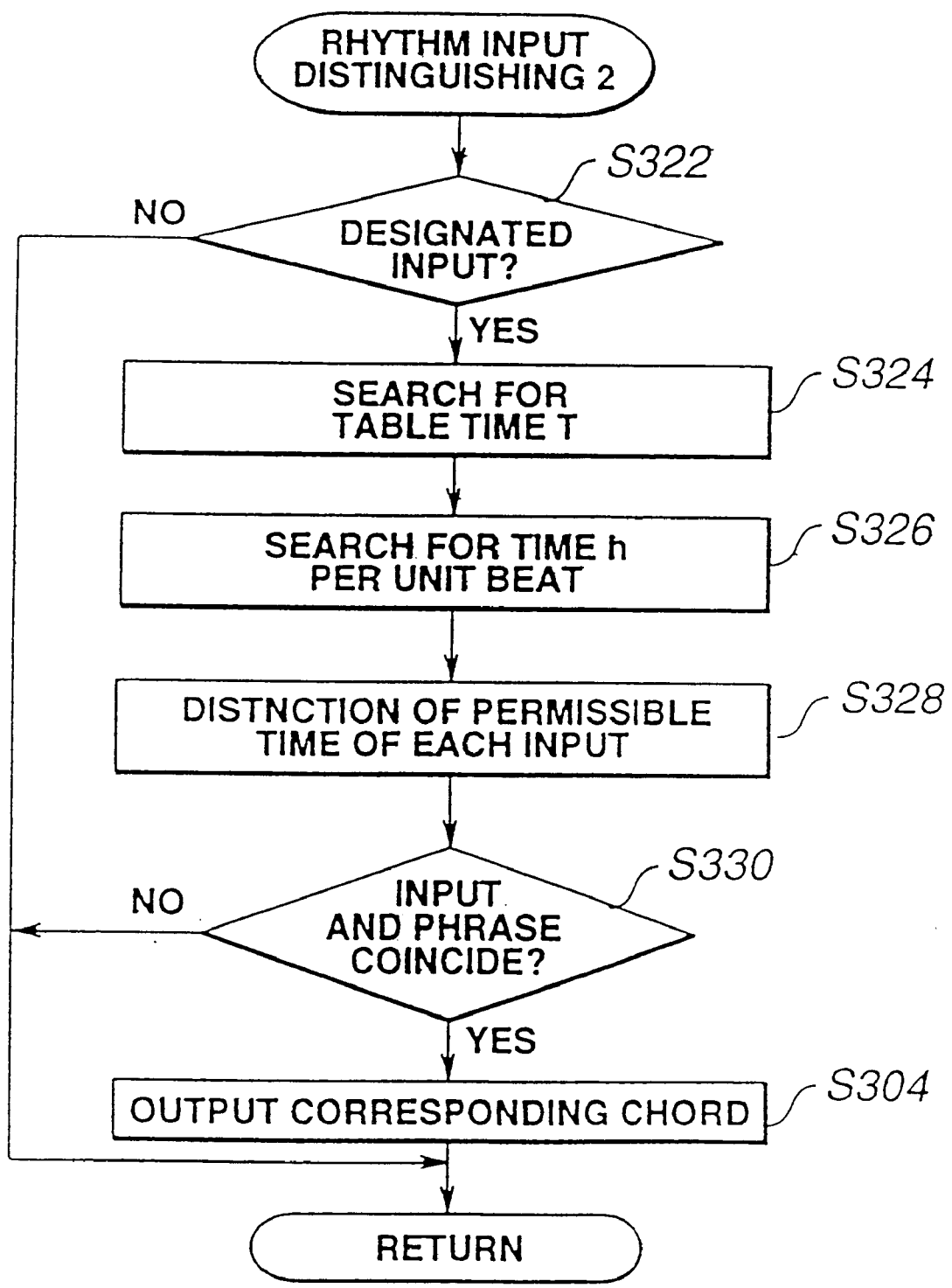
FIG. 26 is a flowchart explaining other algorithms which determine the rhythm input.

FIG. 26 shows distinction examples of other rhythm inputs. In the database, the input number (N) of the entire phrase, the number of beats (H) of the entire phrase, and the number of beats in between each input of the phrase (Rx; provided that, $1 \leq x \leq N$) are stored in advance. Here, a phrase shall mean the required input rhythm. A beat shall mean a unit for calculating the time from one input to another.

For example, with the 3-3-7 rhythm explained above: input number (N)=13, number of beats (H)=15, and number of beats in between each input (Rx) will be "1,1,2,1,1,2,1, 1,1,1,1,1."

If a previously planned input for the above situation is made (S322), the time required for the input number is added and the total time T is calculated. For example, in the situation of the 3-3-7 rhythm above, the sum total of the on time of the 13 inputs is calculated (S324). Next, time h per one (1) beat (=T/number of beats) is searched. In the case of the 3-3-7 rhythm, h=T/15 (S326). Regarding each of the plurality of input signals inputted in order, it is distinguished whether or not the time length (on time) is within the permissible scope by the following formula:

$$(Rx-\Delta R) \times h \leq y \leq (Rx-\Delta R) \times h$$

Here, y is the time required from the input number of x to the input number of x+1, and $\Delta R$ is the permissible input error (S328).

As a result of the above distinction regarding each input, if the input rhythm coincides with a phrase stored in the database (S330), the chord corresponding to the phrase is outputted to the above program (S332).

Like this, input operation by rhythm is possible. With a rhythm input operation, passwords and hidden orders etc. may be inputted with a single switch or a single operation lever. Therefore, the input device may be managed with a simple structure. In addition, the rhythm may be inputted at a speed according to each person's preference. Moreover, as the input operation itself possesses a game quality, such operation in itself will be enjoyable.

The program like the one explained above which realizes the game device and the screen display method therefor on a computer system will be stored on and provided by an information storing medium, for example, CD-ROM, DVD-ROM, and ROM cassette etc.

As explained above, according to the game device of the present invention, when the viewpoint is switched in a 3D game, as the game is advanced from a position in which the time axis of the game has been suitably returned, it is desirable in that the difficulty of the game may be avoided when the screen is switched.

Furthermore, according to the game device of the present invention, as the elapsed time from a certain point is displayed on the screen, it is preferable in that it may be used as a reference for the timing of the swing in a baseball game.

Moreover, according to the game device of the present invention, as fixed information may be inputted into the device by rhythm input, it is preferable in that an input device with a relatively simple structure may be used in a variety of ways.

We claim:

1. A game device comprising:
   game proceeding means for arranging an object in the virtual space formed within the computer system, and proceeding the game while controlling the movement of said object according to the input operation and predetermined rules;
   displaying means for displaying the state within said virtual space as a screen seen from a certain viewpoint;
   distinguishing means for distinguishing the occurrence of a specific event in said game in which said viewpoint should be switched;
   data storage means for storing position-related data of said object corresponding to the occurrence of said event into the memory;
   condition distinguishing means for continuing the game until a first time has elapsed from the occurrence of said event, wherein said first time occurs during the beginning portion of an action sequence following said event;
   reforming means for reforming said virtual space with the stored data of said object when said first time has elapsed;
   and viewpoint position changing means for changing the position of said viewpoint to a second time after said reforming, wherein the second time occurs after said event and before said first time.

2. A game device according to claim 1, wherein said condition distinguishing means is a timer that generates output when said first time has elapsed.

3. A game device according to claim 2, wherein said data storing means stores data of said object in memory when said second time has elapsed.

4. A game device according to claim 3, wherein said second time is either predetermined by the program in correspondence with the object's character or determined by the player.

5. A game device according to claim 1, wherein said game device is a baseball game device including at least a showdown between the pitcher and batter, wherein said baseball game device has pitch distinguishing means which distinguishes the pitch of said pitcher, clocking means which starts clocking in response to said pitch, elapsed time displaying means for displaying on the screen the elapsed time until said pitch is caught.

6. A game device according to claim 5, wherein the game device may be stored on an information storage medium for use in a computer system.

7. A game device according to claim 1, wherein the game device may be stored on an information storage medium for use in a computer system.

8. A screen display method for switching the viewpoint in a game device capable of displaying the state of a proceeding game from a different viewpoint by placing the object in a virtual space, wherein said screen display method of a game device performs the following:
   advances the game to a first time with the present viewpoint when a specific event occurs in which said viewpoint should be switched;
   returns the time axis in said virtual space to a second time when said first time has elapsed, wherein said second time occurs after said event and before said first time;
   switches said viewpoint to another viewpoint, and
   advances said game again.

9. A screen display method according to claim 8, wherein said second time is either predetermined by the program in correspondence with the object's character or determined by the player.

10. A screen display method according to claim 8, wherein said game device is a baseball game device having a pitching screen in which the subject is a pitcher and batter, wherein said screen display method in a baseball game displays the elapsed time on said pitching screen from the time when said pitcher throws the ball until said catcher catches the ball.

11. A game device comprising:
   game proceeding control means for arranging an object in the virtual space and controlling the moving state of said object based on input operations from the player and predetermined rules;
   displaying means for displaying the state within said virtual space as a picture captured from a virtual viewpoint;
   distinguishing means for distinguishing the occurrence of an event in the game for switching said virtual viewpoint;
   viewpoint switching means for changing said virtual viewpoint after a prescribed time has elapsed from the occurrence of said event to a replay time, wherein the replay time occurs before the prescribed time has elapsed and after the occurrence of said event;

data storage means for storing, in the memory, position information of objects in said moving state from the re-play time until the switching of said virtual viewpoint; and game proceeding re-controlling means for re-controlling, upon switching the viewpoint with said viewpoint switching means, the moving state of objects based on the position information of objects stored in said data storage means and returning control to the game proceeding means.

12. A game device according to claim 11, wherein said one point in time is the time of occurrence of said event.

13. A game device comprising:

game proceeding control means for arranging an object in the virtual space and controlling the moving state of said object based on input operations from the player and predetermined rules;

displaying means for displaying the state within said virtual space as a picture captured from a virtual viewpoint;

virtual viewpoint alteration means for altering said virtual viewpoint; and game proceeding re-controlling means for acquiring, upon alteration of said virtual viewpoint, the position information of said objects before alteration and re-controlling the moving state of objects based on such position information of objects and returning control to the game proceeding means.

14. A game display method of arranging an object in a virtual space, controlling the moving state of said object based on input operations from a player or predetermined rules, and displaying the state within said virtual space as a picture captured from a virtual viewpoint, comprising the steps of:

detecting the occurrence of an event for altering said virtual viewpoint;

acquiring, upon alteration of said virtual viewpoint, the position information of said objects before alteration and re-controlling the moving state of objects based on such position information of objects; and switching said virtual viewpoint.

15. A baseball game device which displays a pitcher character and batter character in a baseball game on a screen, and operates said batter character pursuant to operations of a player, said baseball game device comprising;

release timing detection means for detecting the point in time of the ball object being released from said pitcher character;

pitch-path display means for displaying on the screen the pitch path of the ball object thrown by said pitcher character; and pitch time clocking/display means for clocking the ball from the period of time it is thrown by said pitcher character until said ball is caught by said catcher character and displaying the time elapsing state together with the pitch path of said ball object.

16. A baseball game display method which displays a pitcher character and batter character in a baseball game on a screen, and operates said batter character pursuant to operations of a player, said baseball game display method comprising the steps of:

detecting the point in time of the ball object being released from said pitcher character;

displaying on the screen the pitch path of the ball object thrown by said pitcher character; and clocking the ball from the period of time it is thrown by said pitcher character until said ball is caught by said catcher character and displaying the time elapsing state together with the pitch path of said ball object.

* * * * *